US011209684B2

(12) United States Patent
Yabuki

(10) Patent No.: US 11,209,684 B2
(45) Date of Patent: Dec. 28, 2021

(54) LIQUID CRYSTAL DISPLAY DEVICE

(71) Applicants: Panasonic Liquid Crystal Display Co., Ltd., Himeji (JP); Pasona Knowledge Partner Inc., Osaka (JP)

(72) Inventor: Ryosuke Yabuki, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 17/076,702

(22) Filed: Oct. 21, 2020

(65) Prior Publication Data

US 2021/0041742 A1 Feb. 11, 2021

Related U.S. Application Data

(63) Continuation of application No. 16/444,812, filed on Jun. 18, 2019, now Pat. No. 10,845,635.

(30) Foreign Application Priority Data

Jun. 28, 2018 (JP) .............................. JP2018-122560

(51) Int. Cl.
*G02F 1/1333* (2006.01)
*G02F 1/1345* (2006.01)

(52) U.S. Cl.
CPC ...... *G02F 1/133308* (2013.01); *G02F 1/1345* (2013.01)

(58) Field of Classification Search
CPC .............................................. G02F 1/133308
See application file for complete search history.

(56) References Cited

U.S. PATENT DOCUMENTS

| | | |
|---|---|---|
| 10,306,753 B1 | 5/2019 | Fadden et al. |
| 2008/0165316 A1 | 7/2008 | Hasegawa et al. |
| 2009/0051707 A1* | 2/2009 | Hirata .................. G09G 3/3648 345/690 |
| 2009/0147186 A1 | 6/2009 | Nakai et al. |
| 2013/0242542 A1 | 9/2013 | Uchimi |
| 2015/0177527 A1* | 6/2015 | Park ...................... G02B 30/52 359/462 |
| 2016/0330849 A1 | 11/2016 | Brodbeck et al. |
| 2018/0017825 A1 | 1/2018 | Katagiri et al. |
| 2018/0157093 A1* | 6/2018 | Jang ..................... H05K 9/0054 |
| 2019/0313526 A1 | 10/2019 | Busby et al. |

FOREIGN PATENT DOCUMENTS

JP 2011-076107 4/2011

* cited by examiner

*Primary Examiner* — Sang V Nguyen
(74) *Attorney, Agent, or Firm* — Hamre, Schumann, Mueller & Larson, P.C.

(57) ABSTRACT

A liquid crystal display device includes: first and second liquid crystal cells; first and second circuit boards connected to the first and second liquid crystal cells through first and second flexible wiring boards, respectively; a frame disposed on an opposite side to the first liquid crystal cell with respect to the second liquid crystal cell; and a holder that holds the first circuit board and the second circuit board. The first circuit board and the second circuit board are disposed on an opposite side to the second liquid crystal cell with respect to the frame. The second circuit board is located closer to the frame than the first circuit board, and the holder sandwiches the first circuit board, and stores the second circuit board between the frame and the holder.

12 Claims, 16 Drawing Sheets

LIQUID CRYSTAL DISPLAY DEVICE

CROSS-REFERENCE TO RELATED APPLICATION

This application claims priority from Japanese application JP 2018-122560, filed on Jun. 28, 2018. This Japanese application is incorporated herein by reference.

TECHNICAL FIELD

The present invention relates to a liquid crystal display device.

BACKGROUND

A liquid crystal display device is used as a display of a television, a monitor or the like. However, the liquid crystal display device has a contrast ratio lower than an organic electro luminescence (EL) display device.

A technique, in which two display panels overlap each other and an image is displayed on each display panel, is conventionally proposed as a technique of improving a contrast ratio of a liquid crystal display device (for example, see Unexamined Japanese Patent Publication No. 2011-076107). A color image is displayed on a front-side (observer-side) display panel in two display panels disposed back and forth, and a black-and-white image is displayed on a rear-side (backlight-side) display panel, thereby improving the contrast ratio.

SUMMARY

In the liquid crystal display device, a circuit board is connected to a liquid crystal cell included in the display panel through a flexible wiring board. Thus, the liquid crystal display device including the two display panels includes two circuit boards corresponding to two liquid crystal cells.

However, it is difficult to fix the two circuit boards in the liquid crystal display device by a simple method while insulation between the two circuit boards is secured.

The present disclosure provides a liquid crystal display device in which a first circuit board connected to a first liquid crystal cell and a second circuit board connected to a second liquid crystal cell can be fixed by a simple method while the insulation between the first circuit board and the second circuit board can be secured.

A liquid crystal display device according to the present disclosure includes: a first liquid crystal cell; a first circuit board connected to the first liquid crystal cell through a first flexible wiring board; a second liquid crystal cell opposite to the first liquid crystal cell; a second circuit board connected to the second liquid crystal cell through a second flexible wiring board; a frame disposed on an opposite side to the first liquid crystal cell with respect to the second liquid crystal cell; and a holder that holds the first circuit board and the second circuit board, wherein the first circuit board and the second circuit board are disposed on an opposite side to the second liquid crystal cell with respect to the frame, the second circuit board is located closer to the frame than the first circuit board, and the holder sandwiches the first circuit board, and stores the second circuit board between the frame and the holder.

A liquid crystal display device according to the present disclosure includes: a first liquid crystal cell; a first circuit board connected to the first liquid crystal cell through a first flexible wiring board; a second liquid crystal cell opposite to the first liquid crystal cell; and a second circuit board connected to the second liquid crystal cell through a second flexible wiring board, wherein the first circuit board and the second circuit board have substantially identical shape and size in planar view, and are located on a back surface side of the second liquid crystal cell, the second circuit board is located closer to the frame than the first circuit board, and when the liquid crystal display device is viewed from a back surface, the first circuit board and the second circuit board are disposed such that a second end of the second circuit board on an opposite side to the first end to which the second flexible wiring board is connected is exposed from the first circuit board.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Figure 1:
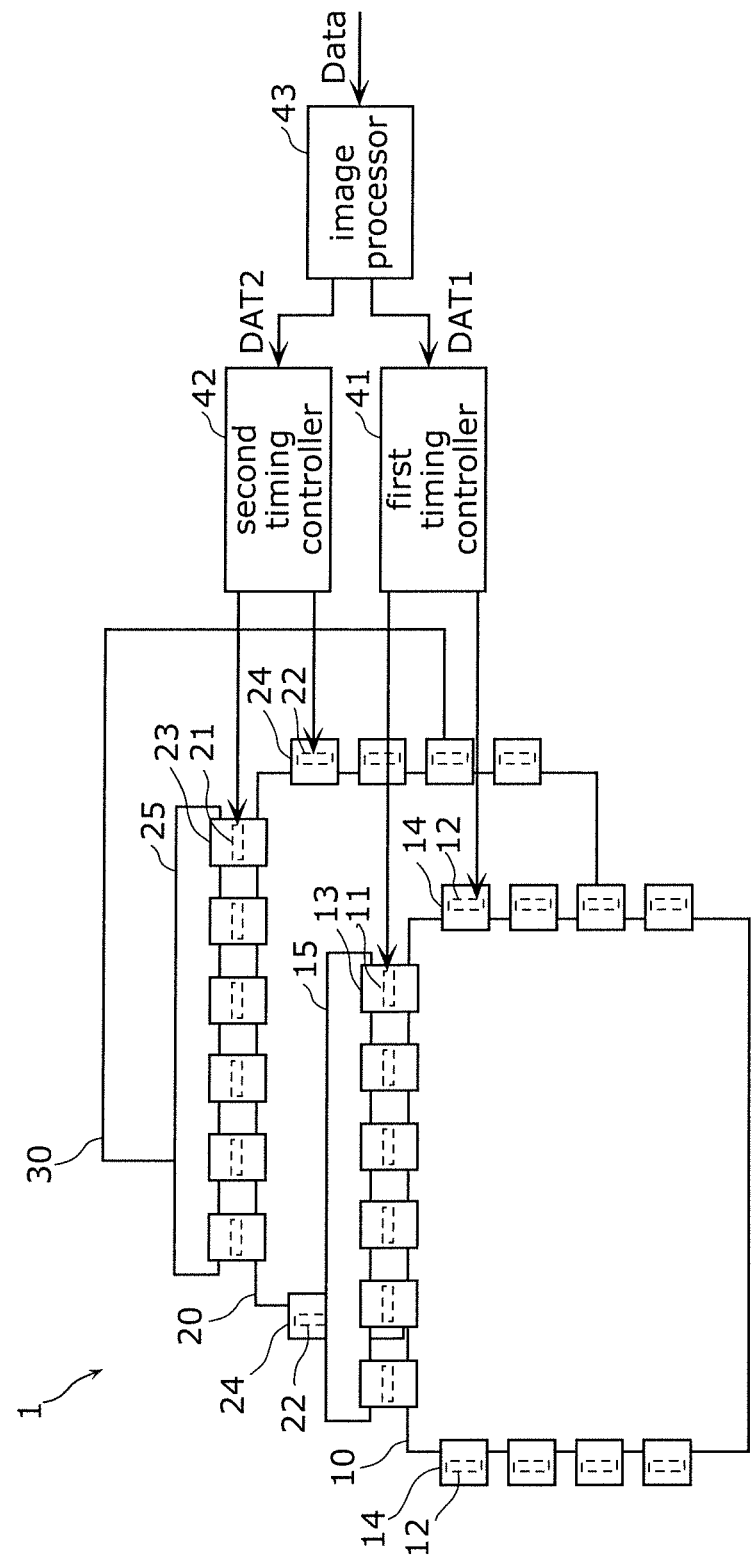
FIG. 1 is a diagram schematically illustrating a schematic configuration of a liquid crystal display device according to a first exemplary embodiment.

Liquid crystal display device 1 according to a first exemplary embodiment will be described below with reference to FIG. 1. FIG. 1 is a view illustrating a schematic configuration of liquid crystal display device 1 of the first exemplary embodiment.

Liquid crystal display device 1 is an example of an image display device configured by superimposing a plurality of display panels each including a liquid crystal cell, and displays an image (video) of a still image or a moving image.

As illustrated in FIG. 1, liquid crystal display device 1 of the present exemplary embodiment includes, as a plurality of display panels, first display panel 10 disposed at a position (front side) close to an observer, second display panel 20 disposed at a position (rear side) far from the observer with respect to first display panel 10, and backlight 30 disposed on a rear side of first display panel 10 and second display panel 20. Specifically, backlight 30 is disposed on the rear side of second display panel 20.

Liquid crystal display device 1 also includes first timing controller 41 that controls first display panel 10, second timing controller 42 that controls second display panel 20, and image processor 43.

First display panel 10 is a main panel that displays an image visually recognized by a user. In the present exemplary embodiment, first display panel 10 displays a color image. First display panel 10 is provided with first source driver 11 and first gate driver 12 in order to display the color image corresponding to an input video signal on an image display region (active region).

Specifically, first display panel 10 includes a first liquid crystal cell (not illustrated) connected to first source FPC 13 on which first source driver 11 is mounted and first gate FPC 14 on which first gate driver 12 is mounted. First source driver 11 and first gate driver 12 are each an IC driver (IC chip) in which an IC is packaged, and are respectively mounted on first source FPC 13 and first gate FPC 14 by a COF (Chip On Film) technique.

Each of first source FPC 13 and first gate FPC 14 is an example of a flexible wiring board, and is a flexible film substrate in which a conductor pattern (metal wiring) made of a metal material such as a copper foil is formed into a predetermined shape on a base film (base material) made of an insulating resin material such as polyimide.

For example, first source FPC 13 and first gate FPC 14 are connected to electrode terminals of various signal lines of the first liquid crystal cell in first display panel 10 by thermocompression bonding using an anisotropic conductive film (ACF).

In the present exemplary embodiment, a plurality of first source FPCs 13 are provided at a long-side end, on an upper side in FIG. 1, of two long-side ends in the first liquid crystal cell of first display panel 10. A plurality of first gate FPCs 14 are provided at each of two short-side ends in the first liquid crystal cell of first display panel 10.

First circuit board 15 is connected to a portion of first source FPC 13 on an opposite side to a side (first liquid crystal cell side) of first display panel 10. First circuit board 15 is a printed circuit board (PCB) having a substantially rectangular plate shape, and has a plurality of electronic components mounted thereon. First circuit board 15 has a function of transmitting various signals output from first timing controller 41 to first source driver 11 mounted on first source FPC 13.

When the color image is displayed on first display panel 10, various signals output from first timing controller 41 are input to first source driver 11 and first gate driver 12.

Second display panel 20 is a sub-panel disposed on the back surface side of first display panel 10. In the present exemplary embodiment, second display panel 20 displays a monochrome image (black and white image) of an image corresponding to the color image displayed on first display panel 10 in synchronization with the color image. Second display panel 20 is provided with second source driver 21 and second gate driver 22 in order to display the monochrome image corresponding to the input video signal on an image display region (active region).

Specifically, second display panel 20 includes a second liquid crystal cell (not illustrated) connected to second source FPC 23 on which second source driver 21 is mounted and second gate FPC 24 on which second gate driver 22 is mounted. Second source driver 21 and second gate driver 22 are each an IC driver (IC chip) in which an IC is packaged, and are respectively mounted on second source FPC 23 and the second gate FPC 24 by the COF technique.

Each of second source FPC 23 and second gate FPC 24 is an example of a flexible wiring board, and for example is a flexible film substrate in which a conductor pattern is formed into a predetermined shape on a base film similarly to first source FPC 13 and first gate FPC 14.

For example, second source FPC 23 and second gate FPC 24 are connected to electrode terminals of various signal lines of the second liquid crystal cell in second display panel 20 by thermocompression bonding using the anisotropic conductive film.

In the present exemplary embodiment, a plurality of second source FPCs 23 are provided at a long-side end, on the upper side in FIG. 1, of two long-side ends in the second liquid crystal cell of second display panel 20. A plurality of second gate FPCs 24 are provided at each of two short-side ends in the second liquid crystal cell of second display panel 20.

Second circuit board 25 is connected to a portion of second source FPC 23 on an opposite side to a side (second liquid crystal cell side) of second display panel 20. Second circuit board 25 is a printed circuit board (PCB) having a substantially rectangular plate shape, and has a plurality of electronic components mounted thereon. Second circuit board 25 has a function of transmitting various signals output from second timing controller 42 to second source driver 21 mounted on second source FPC 23.

When the monochrome image is displayed on second display panel 20, various signals output from second timing controller 42 are input to second source driver 21 and second gate driver 22.

For example, driving systems of first display panel 10 and second display panel 20 are a lateral electric field system such as an in-plane switching (IPS) system or a fringe field switching (FFS) system. However, the driving system is not limited to the lateral electric field system, but may be a vertical alignment (VA) system or a twisted nematic (TN) system.

Backlight 30 is a light source unit disposed on back surface sides of first display panel 10 and second display panel 20, and emits light toward first display panel 10 and second display panel 20. In the present exemplary embodiment, backlight 30 is a surface light source unit that uniformly emits diffused light (scattered light) having a planar shape. For example, backlight 30 is a light emitting diode (LED) backlight in which an LED is used as a light source. However, backlight 300 is not limited to the LED backlight.

First timing controller 41 controls first source driver 11 and first gate driver 12 of first display panel 10. In the present exemplary embodiment, circuit components constituting first timing controller 41 are mounted on first circuit board 15.

Second timing controller 42 controls second source driver 21 and second gate driver 22 of second display panel 20. In the present exemplary embodiment, circuit components constituting second timing controller 42 are mounted on second circuit board 25.

Image processor 43 outputs image data to first timing controller 41 and second timing controller 42. Specifically, image processor 43 receives input video signal Data transmitted from an external system (not illustrated), performs image processing on input video signal Data, outputs first image data DAT1 to first timing controller 41, and outputs second image data DAT2 to second timing controller 42. First image data DAT1 is image data used to display the color image, and second image data DAT2 is image data used to display the monochrome image.

Image processor 43 outputs a first control signal to first timing controller 41, and outputs a second control signal to second timing controller 42. Each of the first control signal and the second control signal includes a synchronizing signal for synchronizing the color image displayed on first display panel 10 and the monochrome image displayed on second display panel 20 with each other. For example, image processor 43 is constructed with a field programmable gate array (FPGA).

In liquid crystal display device 1 according to the present exemplary embodiment, two display panels, that is, first display panel 10 and second display panel 20 which are superimposed on each other display the image, so that black can be tightened. Consequently, the image having a high contrast ratio can be displayed.

For example, liquid crystal display device 1 is a high dynamic range (HDR) compatible television. In liquid crystal display device 1, a color image having high contrast ratio and high image quality can be displayed using a backlight capable of performing local dimming control as backlight 30.

Figure 2:
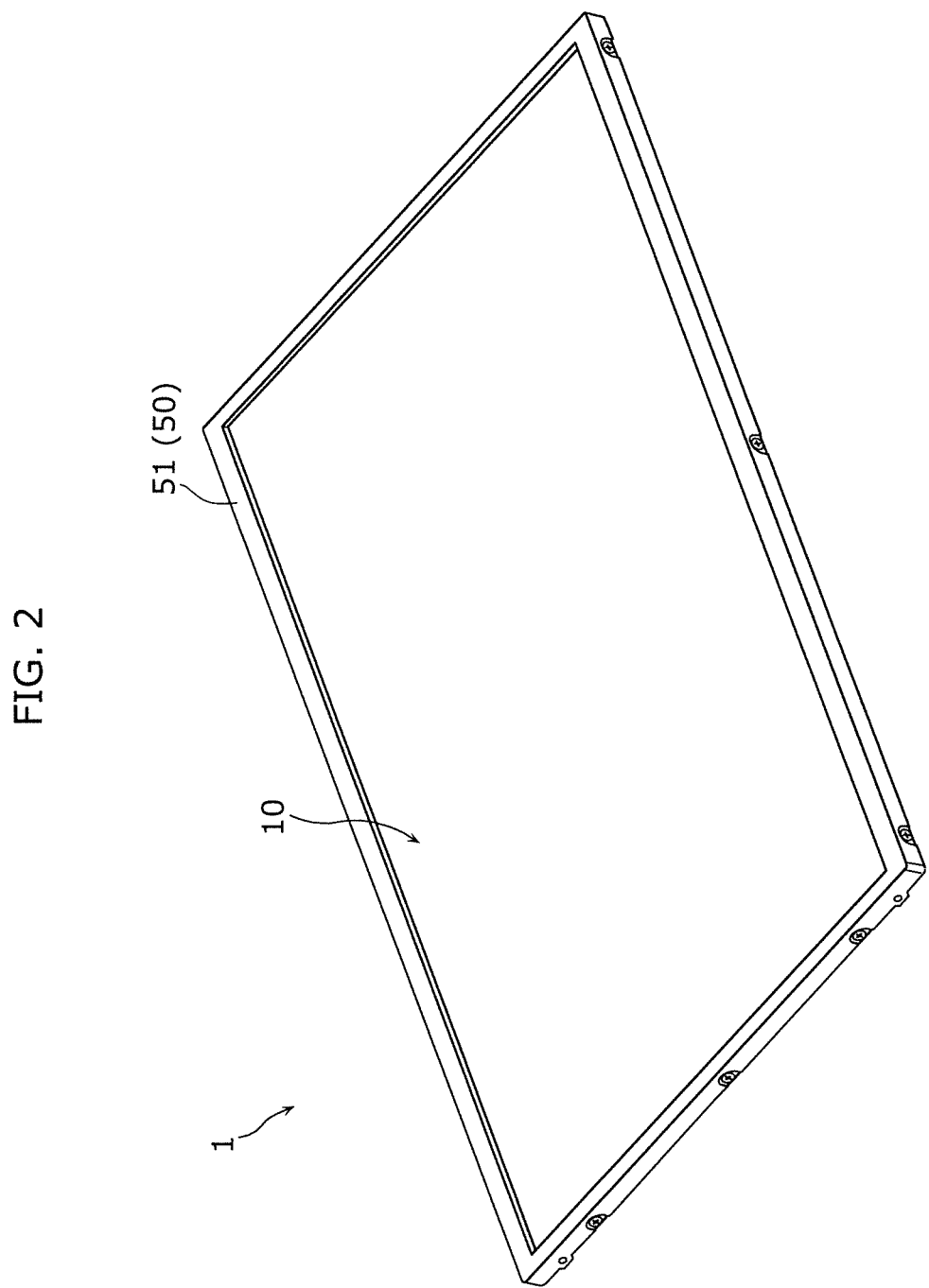
FIG. 2 is a perspective appearance view of a front surface side of the liquid crystal display device according to the first exemplary embodiment.
Figure 3:
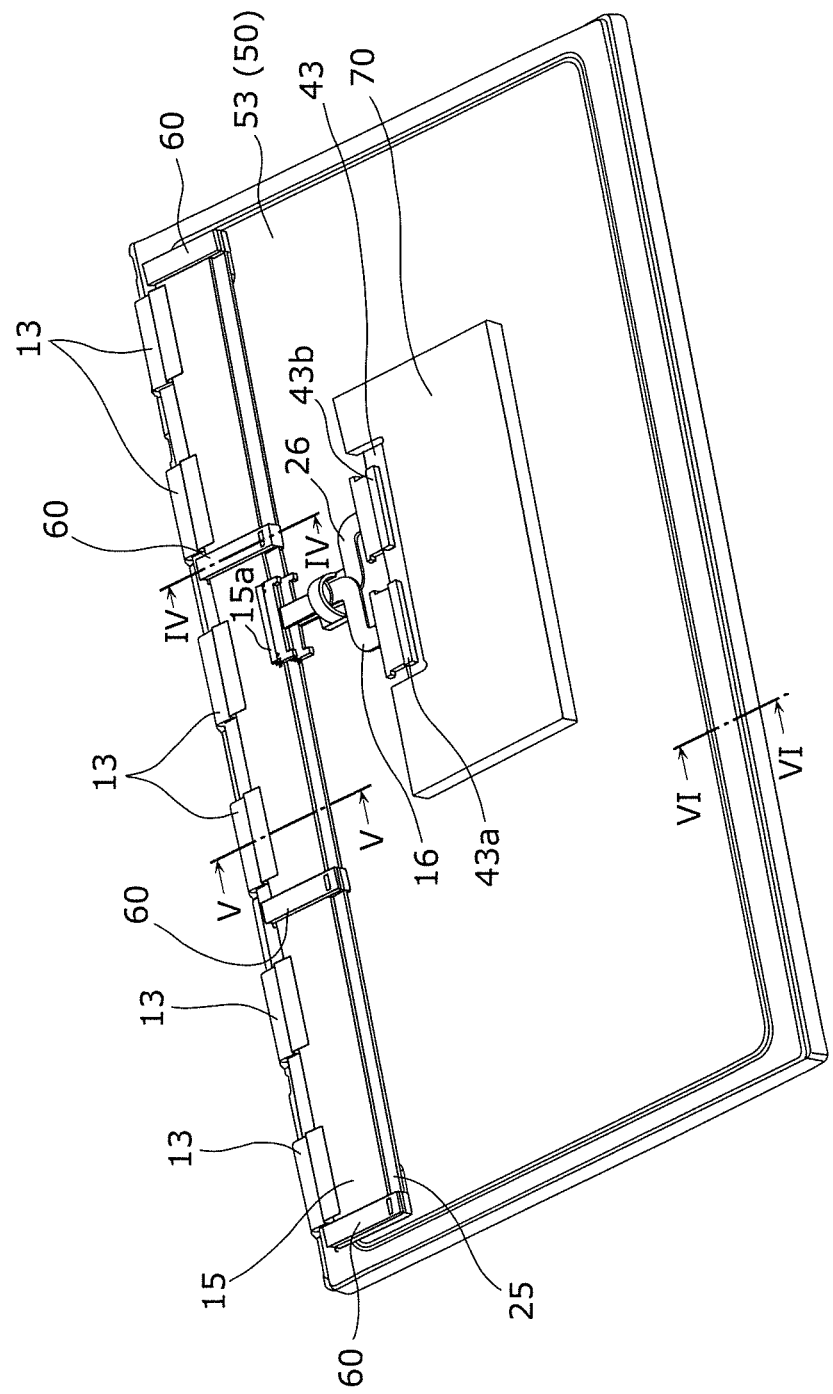
FIG. 3 is a perspective appearance view of a back surface side of the liquid crystal display device, according to the first exemplary embodiment, in which a protective cover protecting a first circuit board and a second circuit board is removed.
Figure 4:
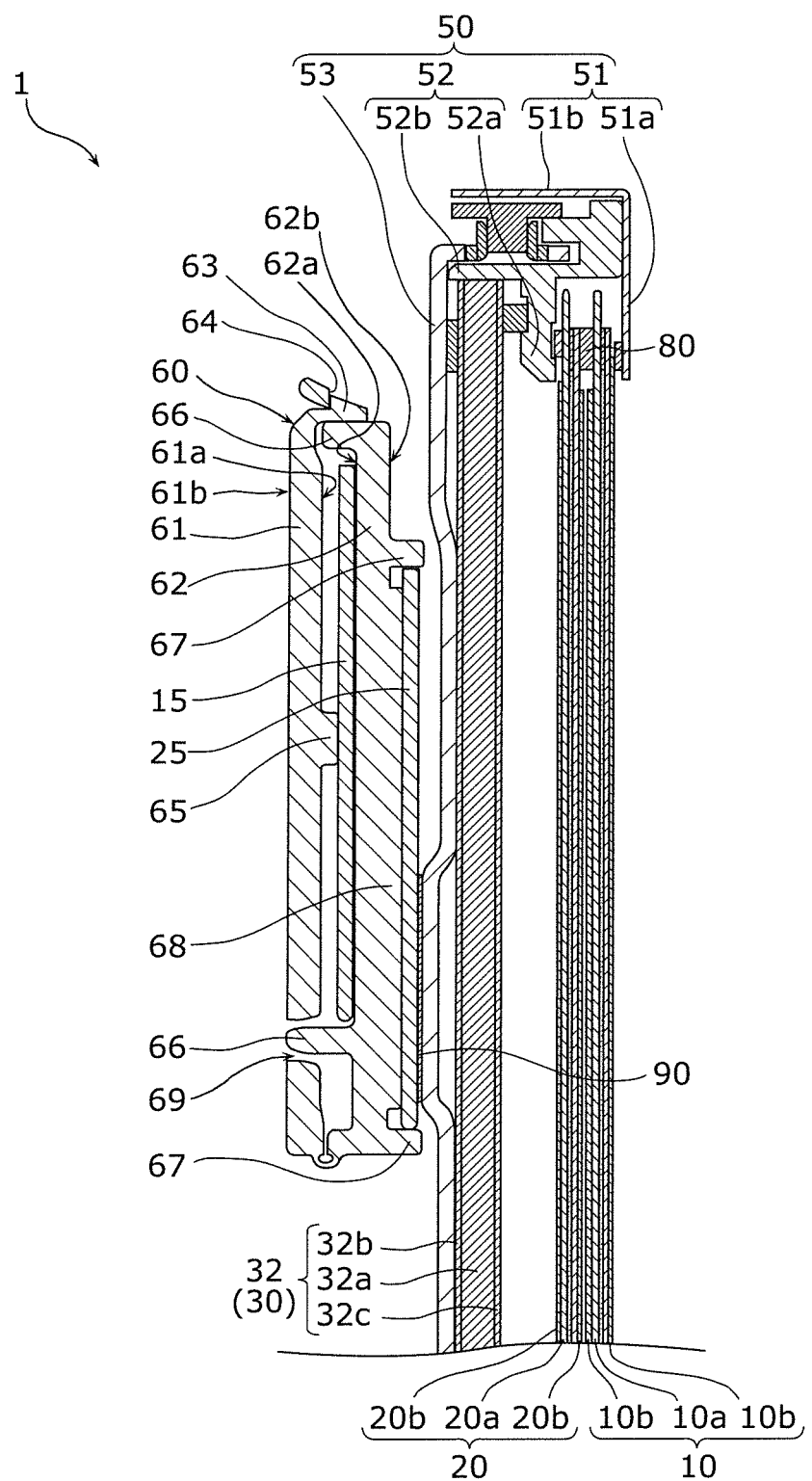
FIG. 4 is a partial sectional view of the liquid crystal display device according to the first exemplary embodiment, taken along line IV-IV in FIG. 3.
Figure 5:
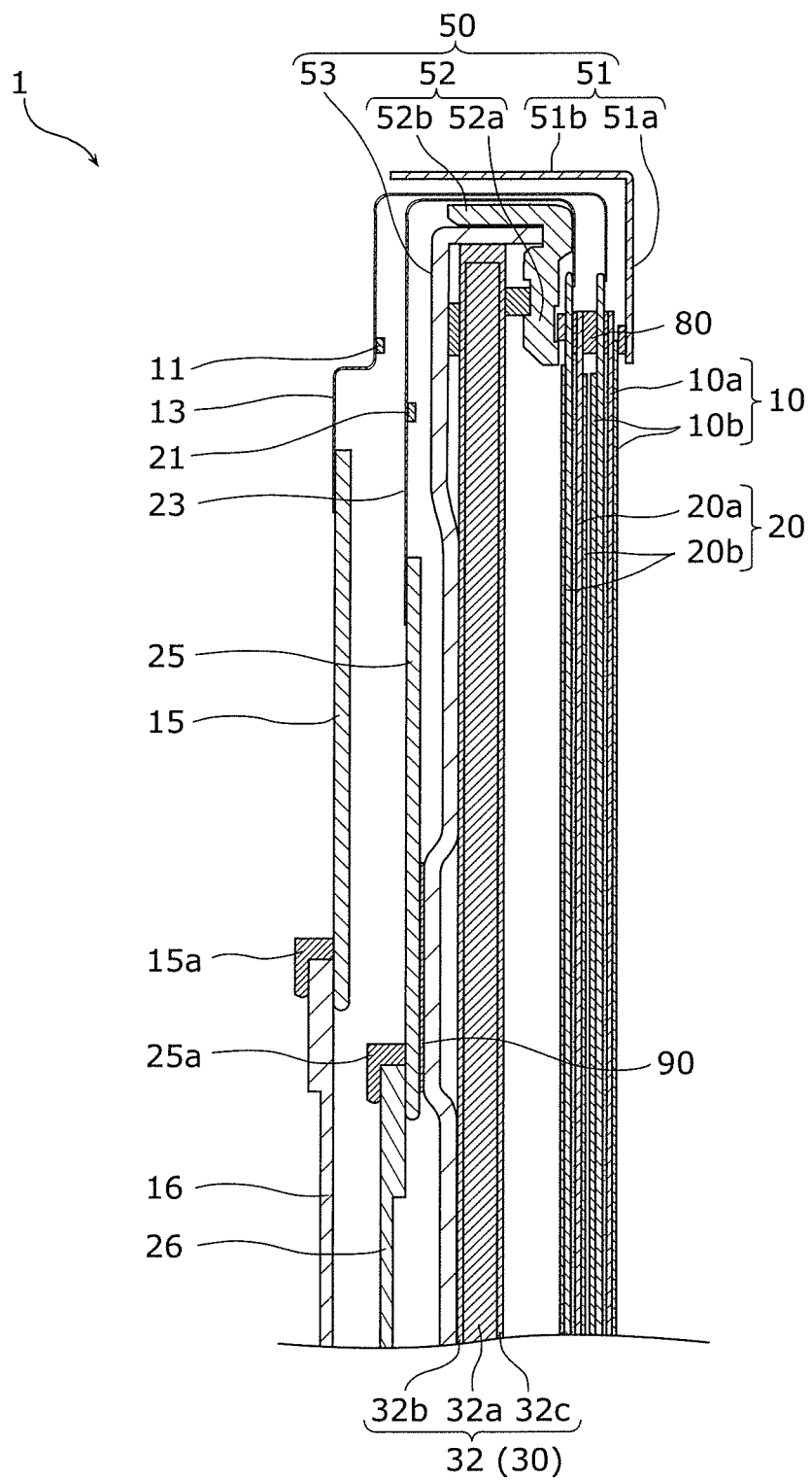
FIG. 5 is a partial sectional view of the liquid crystal display device according to the first exemplary embodiment, taken along line V-V in FIG. 3.
Figure 6:
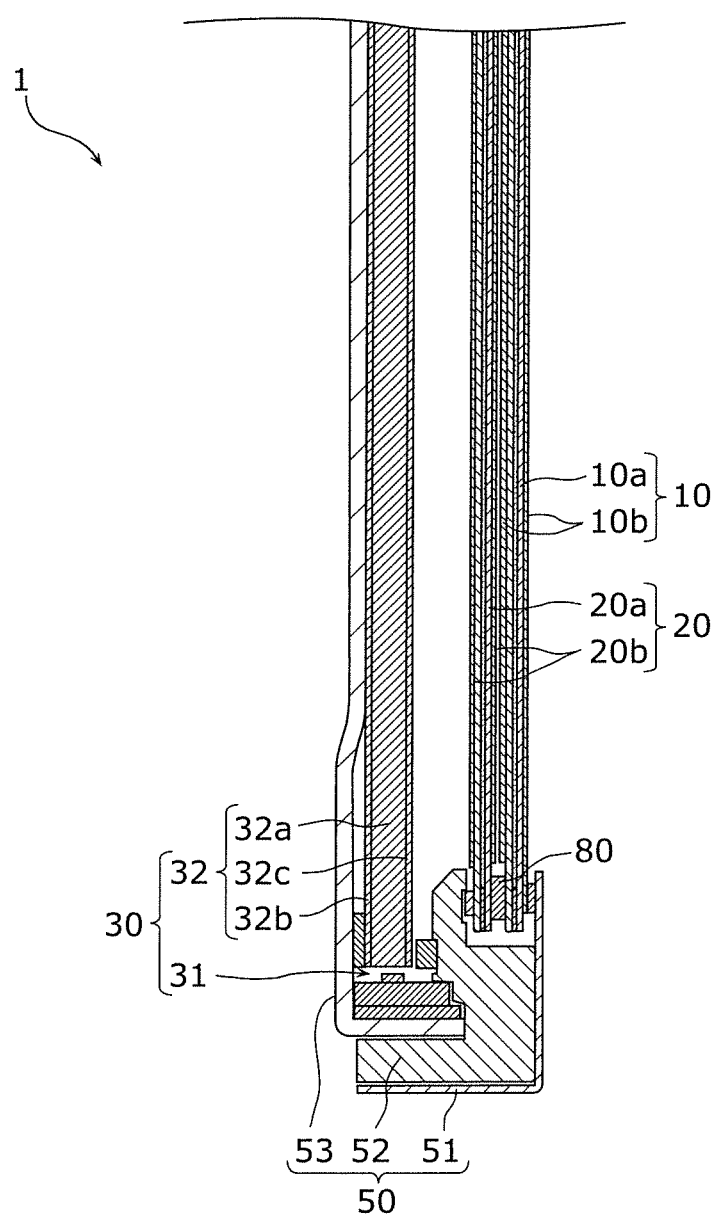
FIG. 6 is a partial sectional view of the liquid crystal display device according to the first exemplary embodiment, taken along line VI-VI in FIG. 3.

Structural features of liquid crystal display device 1 according to the first exemplary embodiment will be described below with reference to FIGS. 2 to 6. FIG. 2 is a perspective appearance view of a front surface side of liquid crystal display device 1 according to the first exemplary embodiment; FIG. 3 is a perspective appearance view of a back surface side of liquid crystal display device 1. FIG. 4 is a partial sectional view of liquid crystal display device 1, taken along line IV-IV in FIG. 3. FIG. 5 is a partial sectional view of liquid crystal display device 1, taken along line V-V in FIG. 3. FIG. 6 is a sectional view of liquid crystal display device 1, taken along line VI-VI in FIG. 3. FIGS. 4 to 6 illustrate members existing only in a section.

As illustrated in FIGS. 4 and 5, two display panels, that is, first display panel 10 and second display panel 20 are incorporated in liquid crystal display device 1 in FIGS. 2 and 3. First display panel 10 and second display panel 20 are disposed opposite to each other. Specifically, first display panel 10 is disposed in front of second display panel 20.

First display panel 10 includes first liquid crystal cell 10a and a pair of first polarizing plates 10b between which first liquid crystal cell 10a is sandwiched.

First liquid crystal cell 10a includes a pair of substrates and a liquid crystal layer sealed between the pair of substrates. One of the pair of substrates is a thin film transistor (TFT) substrate in which a plurality of TFTs are formed on a transparent substrate such as a glass substrate. The other of the pair of substrates is a counter substrate in which a pixel formation layer is formed on a transparent substrate such as a glass substrate. In first liquid crystal cell 10a, the counter substrate is a color filter substrate (CF substrate) on which a color filter layer is formed as the pixel formation layer. The color filter layer includes a black matrix formed into a stripe shape or a lattice shape and a color filter formed in each of a plurality of openings in the black matrix.

First liquid crystal cell 10a is sandwiched between the pair of first polarizing plates 10b. The pair of first polarizing plates 10b is disposed such that polarization directions of first polarizing plates 10b are orthogonal to each other. The pair of first polarizing plates 10b is a sheet-shaped polarizing film made of, for example, a resin material. A phase difference plate (phase difference film) may be bonded to first polarizing plate 10b.

Second display panel 20 includes second liquid crystal cell 20a opposite to first liquid crystal cell 10a and a pair of second polarizing plates 20b between which second liquid crystal cell 20a is sandwiched. Second liquid crystal cell 20a is disposed on the back surface side of first liquid crystal cell 10a.

Second liquid crystal cell 20a includes a pair of substrates and a liquid crystal layer sealed between the pair of substrates. One of the pair of substrates is a TFT substrate in which a plurality of TFTs are formed on a transparent substrate such as a glass substrate. The other of the pair of substrates is a counter substrate in which a pixel formation layer is formed on a transparent substrate such as a glass substrate. Because second display panel 20 displays the monochrome image, the black matrix is formed in the pixel formation layer of the counter substrate of second liquid crystal cell 20a, but the color filter is not formed.

Second liquid crystal cell 20a is sandwiched between the pair of second polarizing plates 20b. The pair of second polarizing plates 20b is disposed such that the polarization directions of second polarizing plates 20b are orthogonal to each other. The pair of second polarizing plates 20b is a sheet-shaped polarizing film made of, for example, a resin material. A phase difference plate (phase-difference film) may be bonded to second polarizing plate 20b.

First display panel 10 and second display panel 20 configured in this way are bonded together by bonding member 80. In the present exemplary embodiment, bonding member 80 is an adhesive tape such as a double-sided tape, and is provided along an outer peripheral edge of each of first display panel 10 and second display panel 20.

Bonding member 80 that bonds first display panel 10 and second display panel 20 together is not limited to the adhesive tape. For example, a bonding layer such as an optically clear adhesive (OCA) sheet or an optically clear adhesive resin (OCR) may be inserted between first display panel 10 and second display panel 20 over the entire surface to bond first display panel 10 and second display panel 20 together.

As illustrated in FIG. 6, backlight 30 includes light source 31 and optical member 32. For example, light source 31 is an LED light source constructed with the LED. In the present exemplary embodiment, because backlight 30 is an edge type, light source 31 is located in a lateral direction of optical member 32.

Specifically, optical member 32 includes light guide plate 32a, reflection sheet 32b disposed on the back surface side of light guide plate 32a, and diffusion sheet 32c disposed on the front side of light guide plate 32a. Light source 31 is disposed opposite to an end face in the lateral direction of light guide plate 32a.

Optical member 32 may include another functional sheet such as a prism sheet. Backlight 30 is not limited to the edge type, but may be a direct type in which light source 31 is constructed with two-dimensionally arrayed LEDs.

As illustrated in FIGS. 2 to 6, liquid crystal display device 1 includes frame 50 that holds first display panel 10, second display panel 20, and backlight 30. As illustrated in FIGS. 4 to 6, frame 50 of the present exemplary embodiment includes upper frame 51 (first frame), intermediate frame 52 (second frame), and lower frame 53 (third frame). For example, upper frame 51, intermediate frame 52, and lower frame 53 are fixed to one another by screws and the like.

Upper frame 51 is a front frame disposed at a frontmost position in frame 50. Because upper frame 51 is an outline member constituting an outline of the frame 50, upper frame 51 may be made of a metal material, such as a steel plate or an aluminum plate, which has high rigidity. In the present exemplary embodiment, upper frame 51 is a metal frame having a rectangular frame shape in planar view and an L-shape in section. By way of example, upper frame 51 can be formed by performing press working such as bending on a metal plate cut into a predetermined shape.

As illustrated in FIGS. 4 and 5, upper frame 51 includes first bezel 51a covering a peripheral portion of first display panel 10 and first sidewall 51b extending from first bezel 51a toward the side of lower frame 53. First bezel 51a protrudes into a flange shape from an upper end of first sidewall 51b, and is formed into a frame shape so as to cover the entire periphery at the outer peripheral end of the surface of first display panel 10.

Intermediate frame 52 is a middle frame disposed between upper frame 51 and lower frame 53. Intermediate frame 52 supports first display panel 10 and second display panel 20 from the back surface side (the side of backlight 30). In the present exemplary embodiment, intermediate frame 52 is a mold frame made of resin. Alternatively, intermediate frame 52 may be a metal frame made of metal.

Intermediate frame 52 includes second bezel 52a covering the peripheral portion of second display panel 20 and a second sidewall 52b extending from second bezel 52a toward the side of lower frame 53. Second bezel 52a laterally protrudes from second sidewall 52b toward the inside, and is formed in the frame shape so as to cover the entire periphery at the outer peripheral end of the rear surface of second display panel 20.

Lower frame 53 is a rear frame disposed at the rearmost position in frame 50. Lower frame 53 is disposed on the opposite side to first liquid crystal cell 10a with respect to second liquid crystal cell 20a. That is, lower frame 53 is disposed on the back surface side of second liquid crystal cell 20a. Specifically, lower frame 53 is disposed on the back surface side of backlight 30.

Because lower frame 53 is an outline member constituting the outline of frame 50, lower frame 53 may be made of a metal material, such as a steel plate or an aluminum plate, which has high rigidity, similarly to upper frame 51. In the present exemplary embodiment, lower frame 53 is a metal casing formed into a concave shape as a whole. For example, lower frame 53 can be formed by performing press working such as drawing on a metal plate.

Frame 50 configured in this way holds first display panel 10, second display panel 20, and backlight 30. Specifically, as illustrated in FIGS. 4 to 6, first display panel 10 and second display panel 20 bonded together by bonding member 80 are held while sandwiched between first bezel 51a of upper frame 51 and second bezel 52a of intermediate frame 52. As illustrated in FIG. 6, backlight 30 is held by intermediate frame 52 and lower frame 53. Specifically, optical member 32 of backlight 30 is supported by a bottom of lower frame 53.

As illustrated in FIGS. 3 to 5, first circuit board 15 and second circuit board 25 are disposed on the back surface side of lower frame 53. That is, first circuit board 15 and second circuit board 25 are disposed on the opposite side to second liquid crystal cell 20a with reference to lower frame 53.

Specifically, as illustrated in FIG. 5, first circuit board 15 is connected to first liquid crystal cell 10a through first source FPC 13 that is the flexible wiring board. First circuit board 15 is disposed so as to be located on the back surface side of lower frame 53 by bending first source FPC 13 into a substantially U-shape in section at the long-side end on the upper side of liquid crystal display device 1. First source FPC 13 is bent so as to go around from the front surface side to the back surface side of lower frame 53 through a space between upper frame 51 and intermediate frame 52.

Second circuit board 25 is connected to second liquid crystal cell 20a through second source FPC 23 that is the flexible wiring board. Second circuit board 25 is disposed so as to be located on the back surface side of lower frame 53 by bending second source FPC 23 into a substantially U-shape in section at the long-side end on the upper side of liquid crystal display device 1. Similarly to first source FPC 13, second source FPC 23 is bent so as to go around from the front surface side to the back surface side of lower frame 53 through a space between upper frame 51 and intermediate frame 52.

In the present exemplary embodiment, because first liquid crystal cell 10a is located in front of second liquid crystal cell 20a, second source FPC 23 and first source FPC 13 are bent such that second source FPC 23 is located inside first source FPC 13. Thus, second circuit board 25 is located closer to lower frame 53 than first circuit board 15 on the back surface side of lower frame 53, and the main surface of second circuit board 25 faces the back surface of lower frame 53. First source FPC 13 and second source FPC 23 are disposed so as to overlap with each other with a gap.

As illustrated in FIG. 3, for example, first circuit board 15 and second circuit board 25 are the long rectangular board. However, first circuit board 15 and second circuit board 25 are not limited to the long rectangular board. In the present exemplary embodiment, first circuit board 15 and second circuit board 25 have substantially identical shape and size in planar view. That is, first circuit board 15 and second circuit board 25 are substantially matched with each other as a whole when overlapping each other. The expression "first circuit board 15 and second circuit board 25 are substantially matched with each other as a whole" means, for example, that contours of first circuit board 15 and second circuit board 25 are matched with each other by at least about 90%.

Figure 7:
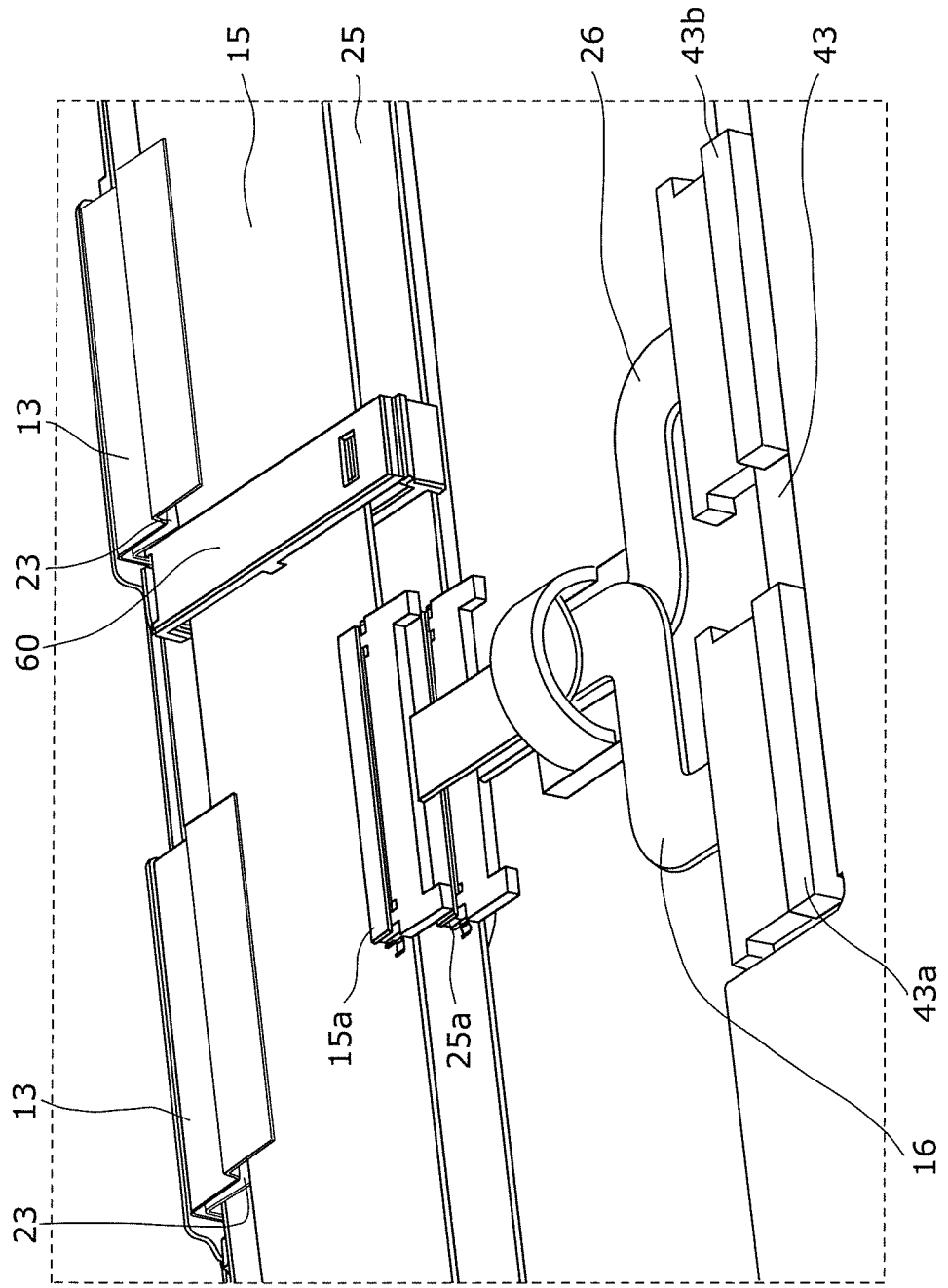
FIG. 7 is an enlarged view of the liquid crystal display device according to the first exemplary embodiment when the liquid crystal display device is viewed from the back surface side.

FIG. 7 is an enlarged view of liquid crystal display device 1 according to the first exemplary embodiment when liquid crystal display device 1 is viewed from the back surface side.

As illustrated in FIG. 7, first connector 15a is disposed on first circuit board 15. First connector 15a is mounted at a second end on the opposite side to the first end to which first source FPC 13 is connected. First cable 16 is connected to first connector 15a. In the present exemplary embodiment, first connector 15a is a female connector, and one male connector of first cable 16 is inserted into first connector 15a. The other male connector of first cable 16 is inserted into first connector 43a (female connector) of image processor 43 (FPGA) provided on the back surface of lower frame 53. Consequently, first connector 15a of first circuit board 15 and first connector 43a of image processor 43 are electrically connected to each other through first cable 16.

On the other hand, second connector 25a is disposed on second circuit board 25. Second connector 25a is mounted at a second end on the opposite side to the first end to which second source FPC 23 is connected. Second cable 26 is connected to second connector 25a. In the present exemplary embodiment, second connector 25a is a female connector, and one male connector of second cable 26 is inserted into second connector 25a. The other male connector of second cable 26 is inserted into second connector 43b (female connector) of image processor 43. Consequently, second connector 25a of second circuit board 25 and second connector 43b of image processor 43 are electrically connected to each other through second cable 26.

Image processor 43 is covered with protective cover 70. Protective cover 70 is a metal cover or a resin cover, and is fixed to lower frame 53 by screws.

As illustrated in FIGS. 3 to 5, first circuit board 15 and second circuit board 25 are disposed at different heights on the back surface side of lower frame 53. Each of first circuit board 15 and second circuit board 25 is disposed in an orientation in which the main surfaces of first circuit board 15 and second circuit board 25 are substantially parallel to the back surface of lower frame 53.

First circuit board 15 and second circuit board 25 are disposed while overlapping each other with a gap. First circuit board 15 and second circuit board 25 are disposed in an offset state. That is, first circuit board 15 and second circuit board 25 are not disposed such that upper first circuit board 15 completely covers lower second circuit board 25, but first circuit board 15 and second circuit board 25 are disposed such that upper first circuit board 15 partially cover lower second circuit board 25.

In the present exemplary embodiment, first circuit board 15 and second circuit board 25 are disposed while shifted in a width direction of first circuit board 15 (a width direction of second circuit board 25), namely, in a transverse direction (a transverse direction of second circuit board 25) of first circuit board 15. Specifically, when liquid crystal display device 1 is viewed from the back surface, first circuit board 15 and second circuit board 25 are disposed such that the second end of second circuit board 25 on the opposite side to the first end to which second source FPC 23 is connected is exposed from first circuit board 15. More specifically, first circuit board 15 and second circuit board 25 are offset until second connector 25a mounted at the second end of second circuit board 25 is exposed from first circuit board 15.

In the present exemplary embodiment, because first source FPC 13 and second source FPC 23 having the same length are used, a relative position between first circuit board 15 and second circuit board 25 are adjusted by increasing the number of folding times of first source FPC 13 located outside while offsetting first circuit board 15 and second circuit board 25. Alternatively, first source FPC 13 and second source FPC 23 may have different lengths.

As illustrated in FIGS. 3 to 5, liquid crystal display device 1 further includes holder 60 holding first circuit board 15 and second circuit board 25. First circuit board 15 and second circuit board 25 are fixed to frame 50 while held by holder 60. In the present exemplary embodiment, first circuit board 15 and second circuit board 25 are fixed to lower frame 53 by holder 60. Specifically, first circuit board 15 is held by holder 60 while sandwiched by holder 60. Second circuit board 25 is held by holder 60 while sandwiched between holder 60 and lower frame 53. As illustrated in FIGS. 4 and 5, in the present exemplary embodiment, second circuit board 25 is fixed to lower frame 53 by bonding member 90 such as an adhesive tape.

Figure 8:
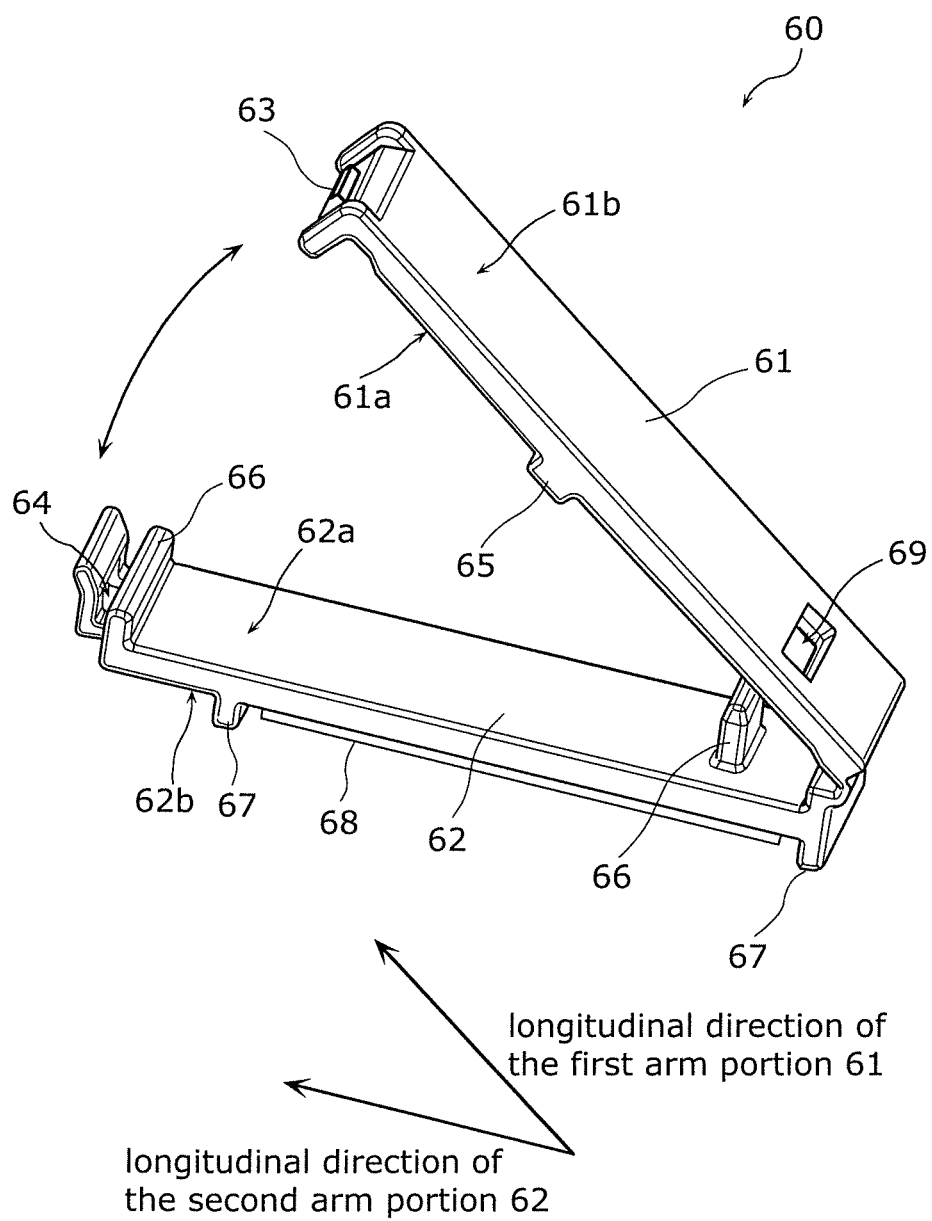
FIG. 8 is a perspective view of a holder in the liquid crystal display device according to the first exemplary embodiment.
Figure 9:
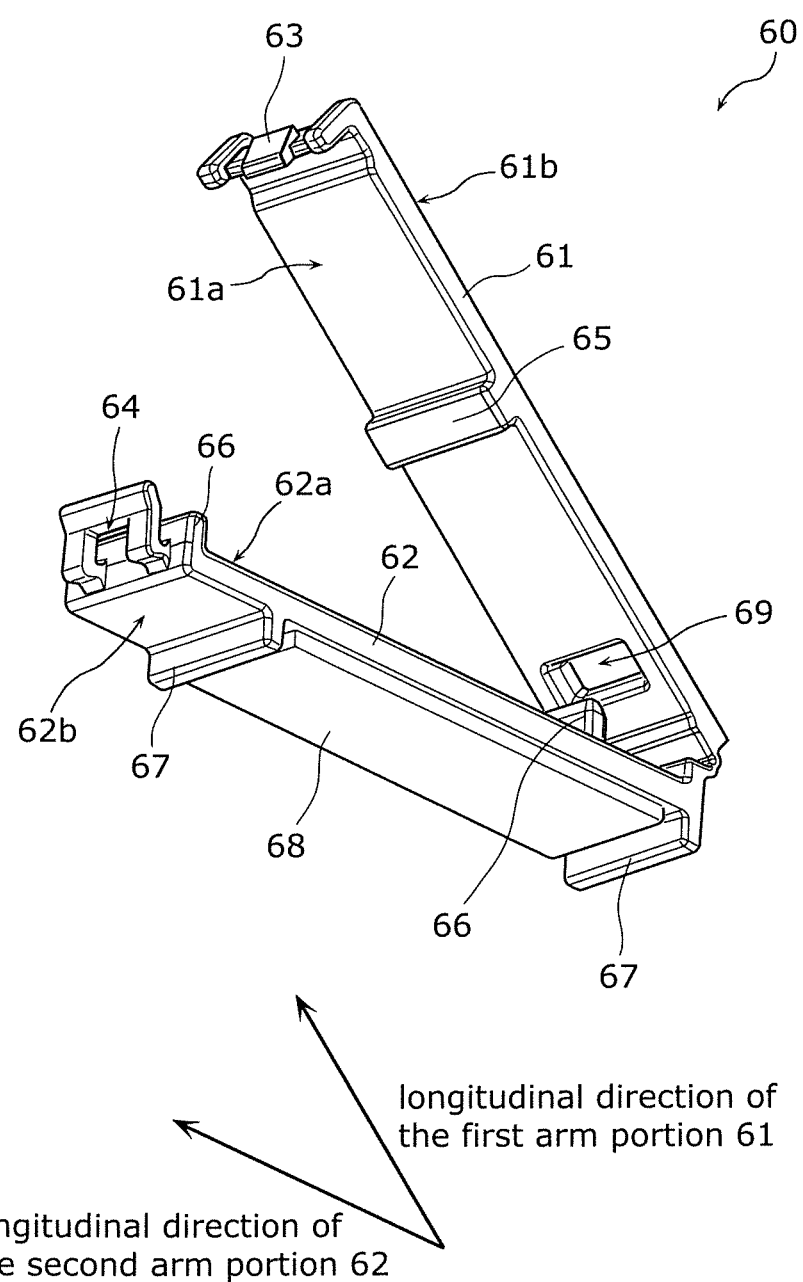
FIG. 9 is a perspective view of the holder in the liquid crystal display device according to the first exemplary embodiment.

A detailed structure of holder 60 will be described with reference to FIGS. 3 to 5, 8 and 9 FIGS. 8 and 9 are perspective views of holder 60 in liquid crystal display device 1 according to the first exemplary embodiment. FIGS. 8 and 9 illustrate holder 60 in a state in which first arm 61 and second arm 62 are not latched.

Holder 60 includes first arm 61 and second arm 62 to be coupled to one end of first arm 61 and coupled to another end of first arm 61 in the longitudinal direction. First arm 61 or second arm 62 is located between first circuit board 15 and second circuit board 25. In the present exemplary embodiment, as illustrated in FIG. 4, second arm 62 is located between first circuit board 15 and second circuit board 25. That is, first circuit board 15 and second circuit board 25 are held by holder 60 while second arm 62 serves as a spacer inserted between first circuit board 15 and second circuit board 25. Consequently, a gap can be secured between first circuit board 15 and second circuit board 25.

First arm 61 includes first surface 61a facing second arm 62 and second surface 61b opposed to first surface 61a. In first arm 61, first surface 61a is located closer to lower frame 53 than second surface 61b.

Second arm 62 includes first surface 62a facing first arm 61 and second surface 62b that is opposite to first surface 62a. In second arm 62, second surface 62b is located closer to lower frame 53 than first surface 62a.

The one end of first arm 61 in the longitudinal direction is detachably coupled to second arm 62. On the other hand, the other end (a root portion of first arm 61) of first arm 61 in the longitudinal direction is rotatably fixed to second arm 62 without being separated from second arm 62.

The first arm 61 is rotatable with the other end of first arm 61 in the longitudinal direction as a rotating fulcrum. Consequently, first arm 61 or second arm 62 can rotate around the coupling portion between the other end of first arm 61 in the longitudinal direction and second arm 62 as the rotating fulcrum. Thus, as illustrated in FIGS. 8 and 9, a shape of holder 60 can be deformed into a V-shape. As described above, in holder 60 of the present exemplary embodiment, a front end of first arm 61 in the longitudinal direction can be brought close to or separated away from a front end of second arm 62.

Latching claw 63 is provided at the one end of first arm 61 in the longitudinal direction. Second arm 62 has latching hole 64 as a latching body in which latching claw 63 of first arm 61 is latched. Latching claw 63 and latching hole 64 are detachably latched. Specifically, first arm 61 can be fixed to second arm 62 by hooking latching claw 63 in latching hole 64 to couple latch latching claw 63 with latching hole 64. On the other hand, first arm 61 can be turned by removing latching claw 63 from latching hole 64 to release the latched state between latching claw 63 and latching hole 64.

As illustrated in FIGS. 3 and 4, first arm 61 and second arm 62 are brought closer to each other while sandwiching first circuit board 15, which allows first circuit board 15 to be sandwiched between first arm 61 and second arm 62. As described above, holder 60 includes first arm 61 and second arm 62 as a sandwiching portion that sandwiches first circuit board 15. That is, first arm 61 and second arm 62 function as the sandwiching portion (clip structure) sandwiching first circuit board 15, and first circuit board 15 is sandwiched between first arm 61 and second arm 62 with first arm 61 and second arm 62 as the sandwiching portion. Specifically, first circuit board 15 is disposed between first surface 61*a* of first arm 61 and first surface 62*a* of the second arm 62.

As described above, first circuit board 15 is sandwiched between first arm 61 and second arm 62, which allows first circuit board 15 to be prevented from moving in a direction perpendicular to the board.

First arm 61 includes first pressing portion 65 that presses the main surface of first circuit board 15 toward second arm 62. In the present exemplary embodiment, first pressing portion 65 is formed so as to protrude from first arm 61 toward second arm 62. First pressing portion 65 is formed in a central portion of first arm 61.

Owing to providing first pressing portion 65 in first arm 61, when first arm 61 is turned to latch latching claw 63 in latching hole 64, first circuit board 15 can be sandwiched between first pressing portion 65 and first surface 62*a* of second arm 62. Consequently, first circuit board 15 can be prevented from moving in the direction perpendicular to the board. The front end surface of first pressing portion 65 may be a flat surface.

A pair of first protrusions 66 sandwiching both ends in the width direction of first circuit board 15 is provided on first surface 62*a* of second arm 62. That is, first circuit board 15 is disposed between the pair of first protrusions 66. The pair of first protrusions 66 are disposed with a space in the longitudinal direction of second arm 62, and formed so as to project from second arm 62 toward first arm 61.

As described above, by providing the pair of first protrusions 66 in the second arm 62, movement of the first circuit board 15 in the horizontal direction of the substrate can be restricted. Specifically, first circuit board 15 can be prevented from moving in the width direction of first circuit board 15.

A spatial region between second arm 62 and lower frame 53 functions as a storage that stores second circuit board 25. That is, holder 60 includes the storage that stores second circuit board 25 between lower frame 53 and holder 60, and second circuit board 25 is disposed between second arm 62 and lower frame 53 while the spatial region between second arm 62 and lower frame 53 serves as the storage.

In the present exemplary embodiment, a pair of second protrusions 67 sandwiching both the ends in the width direction of second circuit board 25 are provided on second surface 62*b* of second arm 62. That is, second circuit board 25 is disposed between the pair of second protrusions 67. The pair of second protrusions 67 is disposed with a space in the longitudinal direction of second arm 62, and formed so as to project from second arm 62 toward lower frame 53.

The spatial region constituting the storage that stores second circuit board 25 can easily be formed in the surface (second surface 62*b*) on the side of lower frame 53 of second arm 62 by providing the pair of second protrusions 67 in second surface 62*b* of second arm 62. That is, second circuit board 25 is accommodated in the spatial region surrounded by the pair of second protrusions 67, second arm 62, and lower frame 53. As described above, in the present exemplary embodiment, the storage of holder 60 is constructed with the spatial region surrounded by the pair of second protrusions 67, second arm 62, and lower frame 53.

Second circuit board 25 can be prevented from moving in a horizontal direction of the board by providing the pair of second protrusions 67 in second arm 62. Specifically, second circuit board 25 can be prevented from moving in the width direction of second circuit board 25.

Second arm 62 includes second pressing portion 68 that presses the main surface of second circuit board 25 in the direction toward lower frame 53. In the present exemplary embodiment, second pressing portion 68 is formed so as to protrude from second arm 62 toward lower frame 53. A height of second pressing portion 68 is lower than a height of the pair of second protrusions 67, and is formed over the entire space between the pair of second protrusions 67.

As described above, second circuit board 25 can be sandwiched between second pressing portion 68 and lower frame 53 by providing the second pressing portion 68 in second arm 62. Consequently, second circuit board 25 can be prevented from moving in the direction perpendicular to the board. The front end surface of second pressing portion 68 may be a flat surface.

Through-hole 69 is provided with first arm 61. While latching first arm 61 and second arm 62, one of the pair of first protrusions 66 is inserted into through-hole 69. The other of the pair of first protrusions 66 does not contact with first arm 61. For this reason, the heights of the pair of first protrusions 66 are different from each other.

Thus, mechanical strength of holder 60 can be improved by making through-hole 69 into which first protrusion 66 is inserted in first arm 61 in the state in which latching claw 63 and latching hole 64 are latched while first circuit board 15 is sandwiched between first arm 61 and second arm 62. That is, when first protrusion 66 is inserted into through-hole 69, first arm 61 and the second arm 62 can be supported by a portion except for the connecting portion of latching claw 63 and latching hole 64 and the root portions of first arm 61 and second arm 62. Consequently, the mechanical strength of holder 60 can be improved while first circuit board 15 is sandwiched, so that latching claw 63 can be prevented from slipping out of latching hole 64 due to concentration of a load on the connection portion of latching claw 63 and latching hole 64 by vibration or the like.

First arm 61 and second arm 62 configured as described above have an integral structure. Holder 60 is an insulating member made of an insulating material. For example, holder 60 is an integrally molded product made of an insulating resin material. First arm 61 and second arm 62 are not limited to the integral structure, but may be constructed with two separable components. Holder 60 is not limited to the structure in which first arm 61 and second arm 62 can be detachably attached, but may be a structure in which first arm 61 and second arm 62 once coupled are not easily separated from each other.

Figure 10:
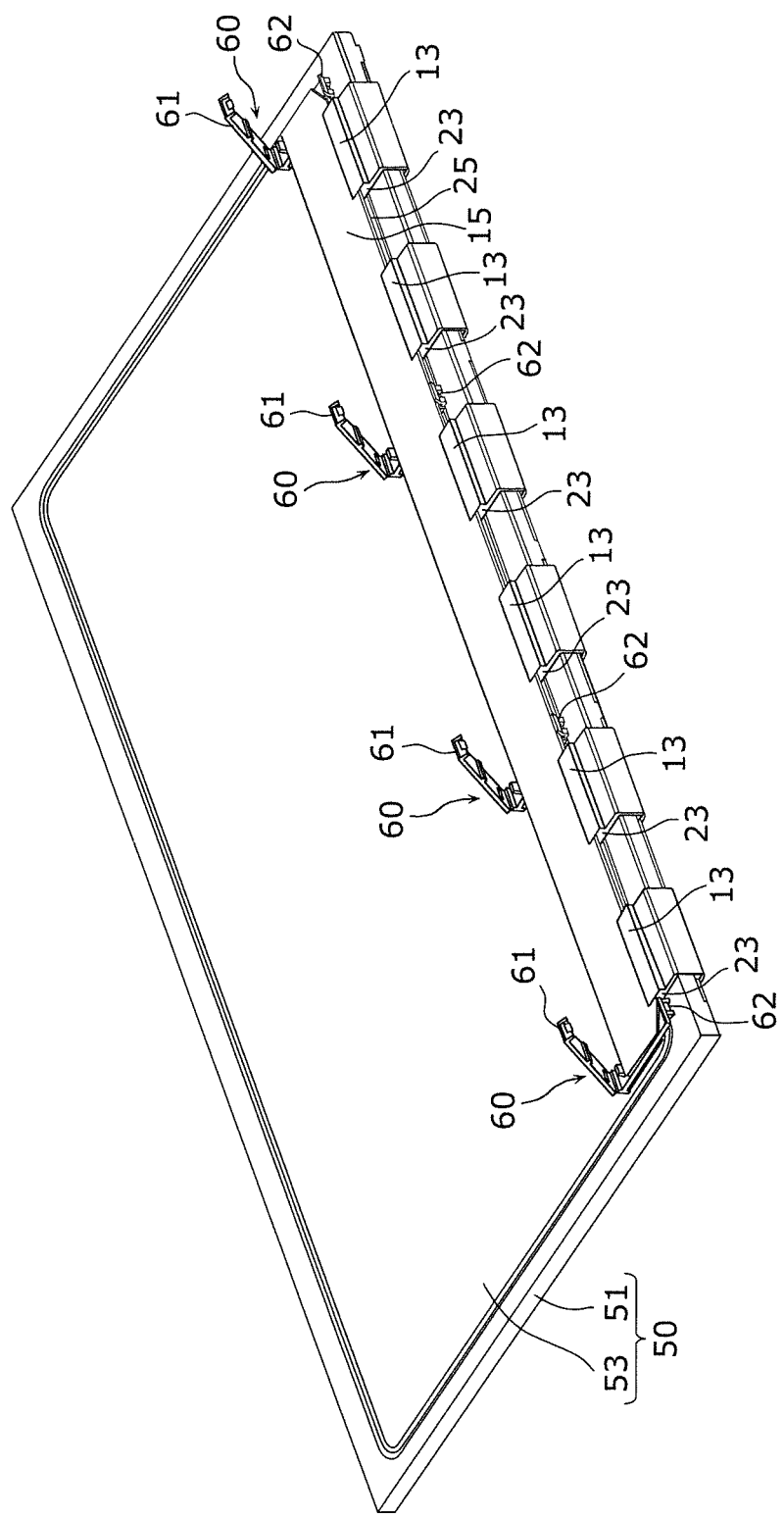
FIG. 10 is a perspective view illustrating a state in which the first circuit board and the second circuit board are fixed to the frame using the holder (a state before the first circuit board is sandwiched by the holder)
Figure 11:
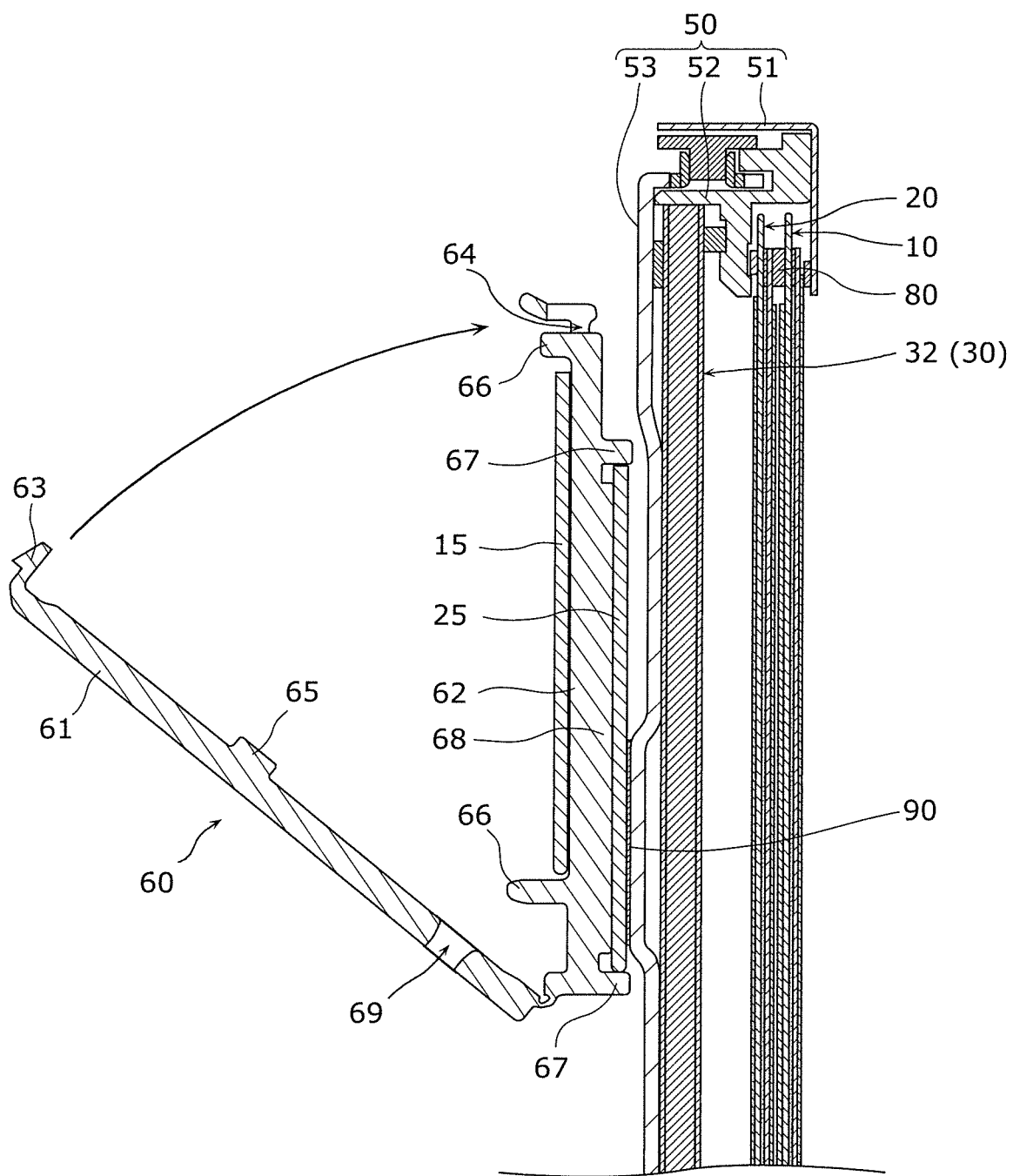
FIG. 11 is a sectional view illustrating the state in which the first circuit board and the second circuit board are fixed to the frame using the holder (the state before the first circuit board is sandwiched by the holder)
Figure 12:
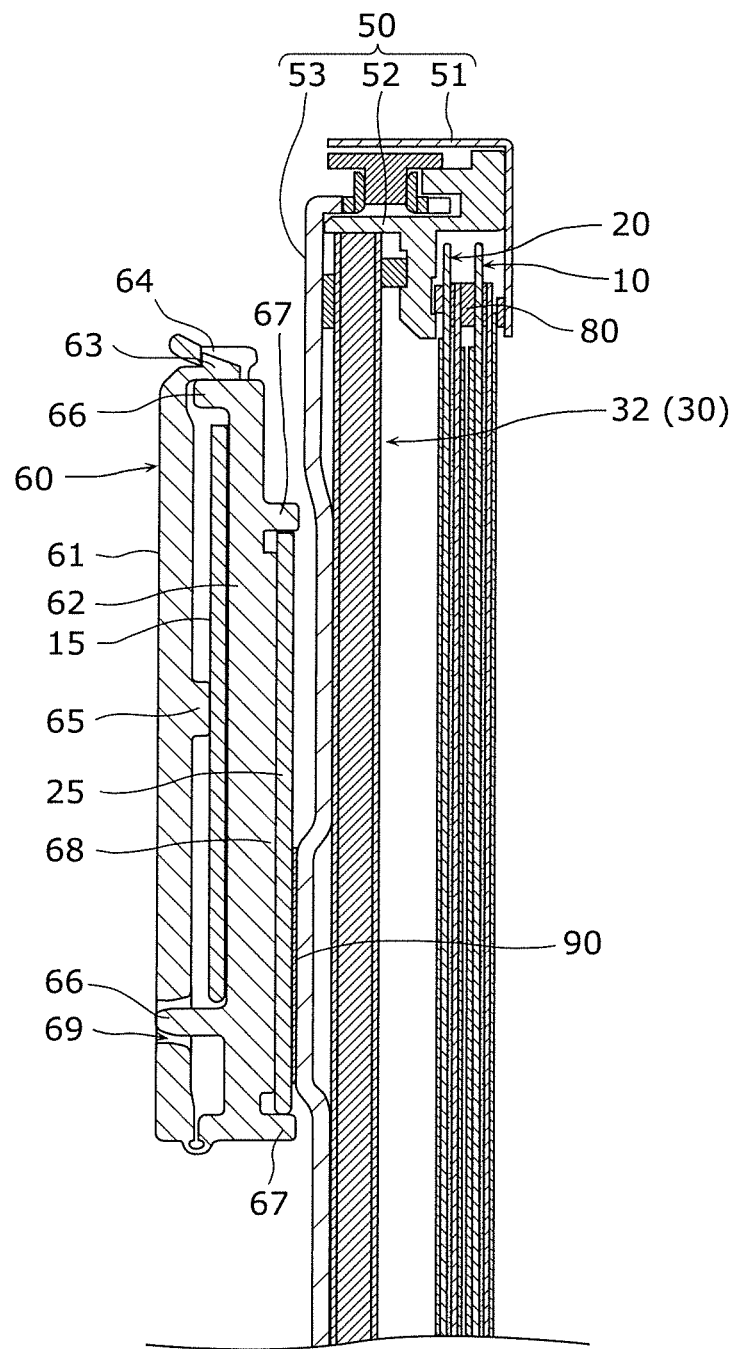
FIG. 12 is a sectional view illustrating the state in which the first circuit board and the second circuit board are fixed to the frame using the holder (the state after the first circuit board is sandwiched by the holder)

A method for fixing first circuit board 15 and second circuit board 25 to frame 50 will be described below with reference to FIGS. 10 to 12. FIGS. 10 to 12 illustrate the state in which first circuit board 15 and second circuit board 25 are fixed to frame 50 using holder 60. FIG. 10 is a perspective view illustrating the state before first circuit board 15 is sandwiched by holder 60, and FIG. 11 is a sectional view at that time. FIG. 12 is a sectional view illustrating the state after first circuit board 15 is sandwiched by holder 60.

First, second circuit board 25 is disposed on the back surface side of lower frame 53 by bending second source FPC 23. At this point, second circuit board 25 is bonded to lower frame 53 using bonding member 90. For example, bonding member 90 is an adhesive tape such as a double-sided tape. Alternatively, bonding member 90 may be an application type adhesive or the like.

Subsequently, holder 60 is disposed on second circuit board 25. In the present exemplary embodiment, four holders 60 are disposed on second circuit board 25. At this point, holders 60 are disposed such that both the ends in the width direction of second circuit board 25 are sandwiched between second protrusions 67. Consequently, second circuit board 25 is stored in the storage of holder 60. Specifically, second circuit board 25 is stored between second arm 62 and lower frame 53 while sandwiched between second arm 62 of holder 60 and lower frame 53.

In this case, each holder is disposed while the front end of first arm 61 is separated from second arm 62. When holder 60 is disposed on second circuit board 25, a bonding member such as a double-sided tape may be inserted between second circuit board 25 and second arm 62. Consequently, holder 60 and second circuit board 25 can be fixed to each other.

Subsequently, as illustrated in FIGS. 10 and 11, first circuit board 15 is disposed on holder 60 by bending first source FPC 13. At this point, first circuit board 15 is disposed on each holder 60 such that both the ends in the width direction of first circuit board 15 are sandwiched between first protrusions 66.

Subsequently, first arm 61 of holder 60 is brought close to second arm 62 as illustrated by an arrow in FIG. 11, and latching claw 63 of first arm 61 is latched in latching hole 64 of second arm 62 as illustrated in FIG. 12. Consequently, first circuit board 15 can be sandwiched between first arm 61 and second arm 62.

As described above, in liquid crystal display device 1 of the present exemplary embodiment, holder 60 holding first circuit board 15 and second circuit board 25 is provided. Specifically, holder 60 includes the sandwiching portion that sandwiches first circuit board 15 and the storage that stores second circuit board 25 between lower frame 53 and holder 60.

First circuit board 15 and second circuit board 25 are held using holder 60 configured in this way while the gap is provided between first circuit board 15 and second circuit board 25. Consequently, first circuit board 15 and second circuit board 25 can be fixed by a simple method while the insulation between first circuit board 15 and second circuit board 25 is secured.

In the present exemplary embodiment, holder 60 includes first arm 61 and second arm 62 to be coupled to the one end of first arm 61 and coupled to the other end of first arm 61 in the longitudinal direction, and first circuit board 15 and second circuit board 25 are disposed while second arm 62 is located between first circuit board 15 and second circuit board 25.

With this configuration, second arm 62 is inserted as a spacer between first circuit board 15 and second circuit board 25, so that the gap between first circuit board 15 and second circuit board 25 can easily be secured.

In the present exemplary embodiment, when liquid crystal display device 1 is viewed from the back surface, the second end of second circuit board 25 on the opposite side to the first end to which second source FPC 23 is connected is disposed so as to be exposed from first circuit board 15.

With this configuration, as illustrated in FIGS. 3 and 4, second connector 25a mounted at the second end of second circuit board 25 can be exposed from first circuit board 15. Consequently, even if second circuit board 25 is located on the rear side of first circuit board 15 (that is, between first circuit board 15 and lower frame 53), the male connector of second cable 26 can easily be inserted into or pulled out from second connector 25a. That is, the male connector of second cable 26 can easily be inserted into and pulled out from second connector 25a. Thus, after the gap is provided between first circuit board 15 and second circuit board 25 to secure the insulation, first circuit board 15 and second circuit board 25 can easily be connected to first cable 16 and second cable 26, respectively.

Second Exemplary Embodiment

Figure 13:
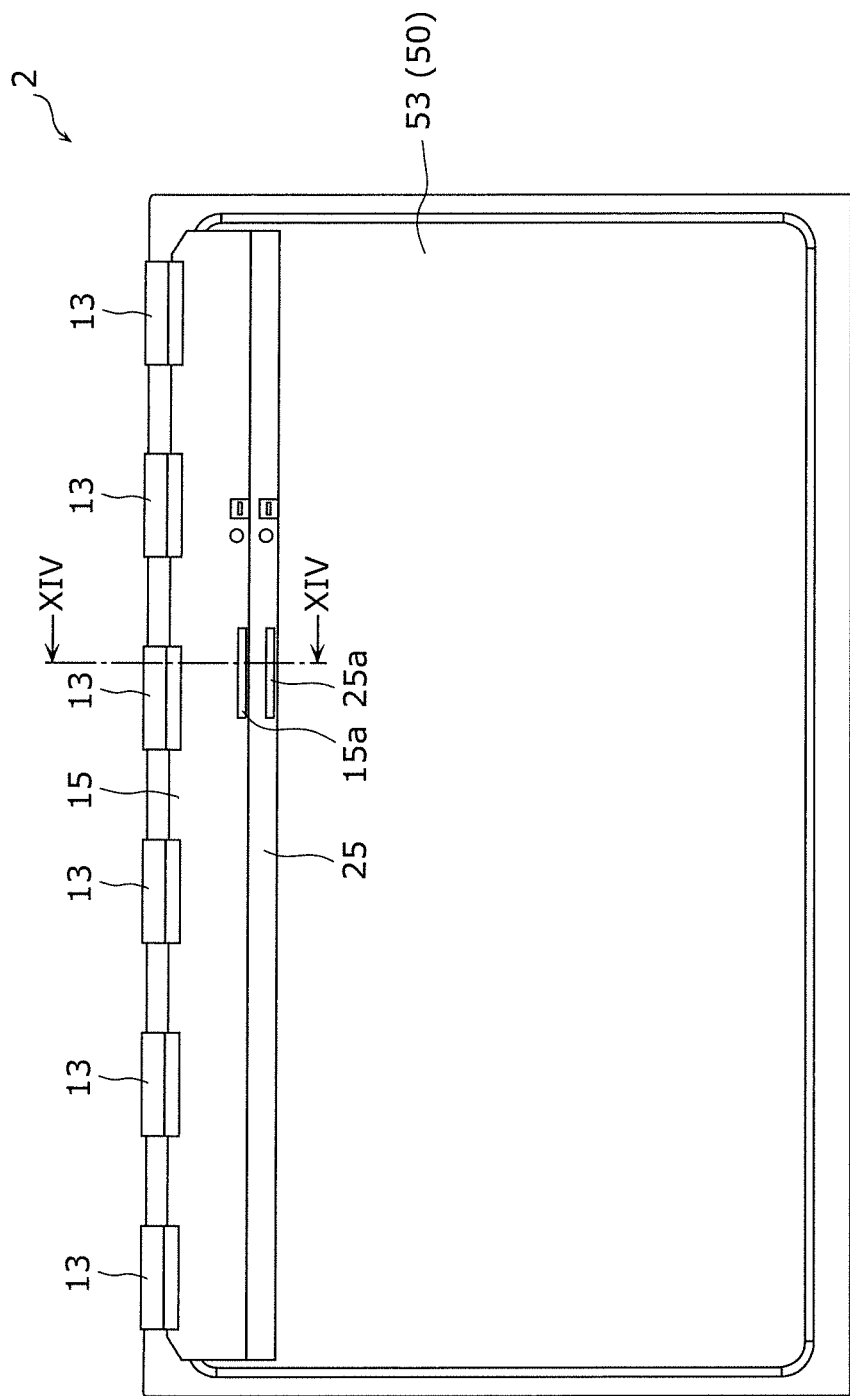
FIG. 13 is a rear view of a liquid crystal display device according to a second exemplary embodiment.
Figure 14:
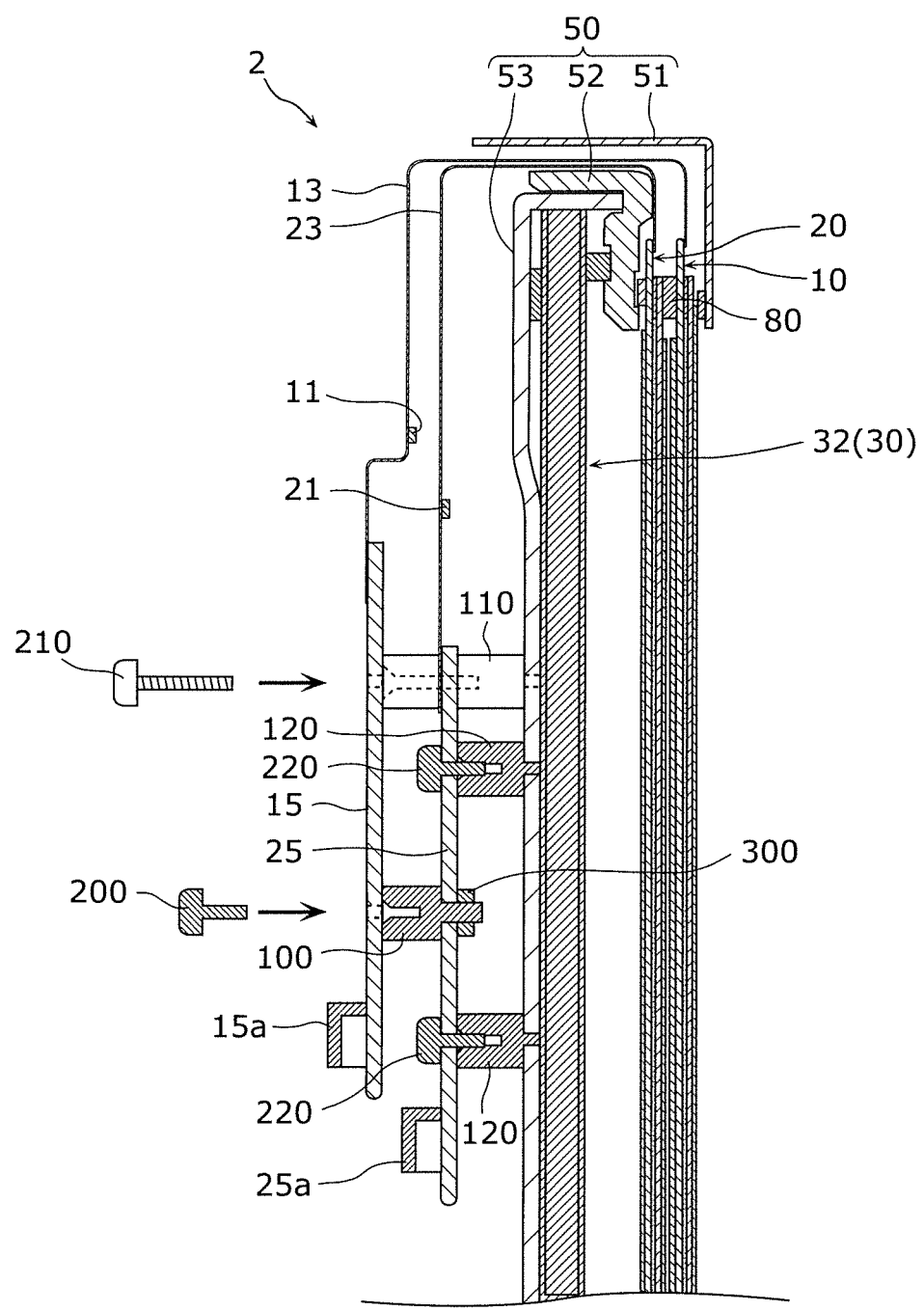
FIG. 14 is a partial sectional view of the liquid crystal display device according to the second exemplary embodiment, taken along line XIV-XIV in FIG. 13.

Liquid crystal display device 2 according to a second exemplary embodiment will be described below with reference to FIGS. 13 and 14. FIG. 13 is a rear view of liquid crystal display device 2 according to the second exemplary embodiment. FIG. 14 is a partial sectional view of liquid crystal display device 2, taken along line XIV-XIV in FIG. 13.

In liquid crystal display device 1 of the first exemplary embodiment, first circuit board 15 and second circuit board 25 are fixed to frame 50 while the gap between first circuit board 15 and second circuit board 25 is secured using holder 60. On the other hand, in liquid crystal display device 2 of the present exemplary embodiment, as illustrated in FIGS. 13 and 14, first circuit board 15 and second circuit board 25 are fixed to frame 50 while the gap between first circuit board 15 and second circuit board 25 is secured using a spacer bolt.

Specifically, spacer bolt 100 is disposed between first circuit board 15 and second circuit board 25. That is, spacer bolt 100 is disposed in a portion in which first circuit board 15 and second circuit board 25 overlap each other.

First circuit board 15 and spacer bolt 100 are fixed to each other by screw 200, and second circuit board 25 and spacer bolt 100 are fixed to each other by nut 300. First circuit board 15 has a through-hole into which the screw 200 is inserted, and second circuit board 25 has a through-hole into which a screw shaft of spacer bolt 100 is inserted.

Spacer bolt 100 may be disposed in a reverse direction, first circuit board 15 and spacer bolt 100 may be fixed to each other by nut 300, and second circuit board 25 and spacer bolt 100 may be fixed to each other by screw 200.

By disposing spacer bolt 100 between first circuit board 15 and second circuit board 25 in this way, first circuit board 15 and second circuit board 25 can easily be fixed to each other while the gap is provided between first circuit board 15 and second circuit board 25 to secure the insulation.

First spacer bolt 110 is disposed between first circuit board 15 and lower frame 53. First circuit board 15 has a through-hole into which screw 200 is inserted, and first circuit board 15 and first spacer bolt 110 are fixed to each other by screw 210.

Second spacer bolt 120 is disposed between second circuit board 25 and lower frame 53. Second circuit board 25 has a through-hole into which screw 220 is inserted, and second circuit board 25 and second spacer bolt 120 are fixed to each other by screw 220.

Thus, first circuit board 15 and second circuit board 25 can easily be fixed to lower frame 53 using first spacer bolt 110 and second spacer bolt 120.

In the present exemplary embodiment, the height of first spacer bolt 110 used to fix first circuit board 15 is higher than the height of second spacer bolt 120 used to fix second circuit board 25. Specifically, the height of first spacer bolt 110 is higher than the height of second spacer bolt 120 by the height of spacer bolt 100 disposed between first circuit board 15 and second circuit board 25.

With this configuration, first circuit board 15 and second circuit board 25 can be disposed with the gap in the substantially parallel state by spacer bolt 100, first spacer bolt 110, and second spacer bolt 120.

As described above, also in liquid crystal display device 2 of the present exemplary embodiment, first circuit board 15 and second circuit board 25 can be fixed to frame 50 while the gap is provided between first circuit board 15 and second circuit board 25. Consequently, first circuit board 15 and second circuit board 25 can be fixed by a simple method while the insulation between first circuit board 15 and second circuit board 25 is secured.

In the present exemplary embodiment, first circuit board 15 and second circuit board 25 have substantially identical shape and size in planar view similarly to the first exemplary embodiment. When liquid crystal display device 2 is viewed from the back surface, first circuit board 15 and second circuit board 25 are disposed such that the second end of second circuit board 25 on the opposite side to the first end to which second source FPC 23 is connected is exposed from first circuit board 15. That is, first circuit board 15 and second circuit board 25 are disposed in the offset state.

With this configuration, as illustrated in FIGS. 13 and 14, second connector 25a mounted at the second end of second circuit board 25 can be exposed from first circuit board 15. Consequently, similarly to the first exemplary embodiment, the male connector of second cable 26 (not illustrated) can easily be inserted into and pulled out from second connector 25a of second circuit board 25 even if second circuit board 25 is located on the rear side of first circuit board 15.

When first circuit board 15 in only the region where first circuit board 15 is offset is fixed by the screw while first circuit board 15 and second circuit board 25 are offset from each other, first circuit board 15 tends to be unstable. However, as in the present exemplary embodiment, first circuit board 15 can be stably fixed by inserting spacer bolt 100 into the portion in which first circuit board 15 and second circuit board 25 overlap each other.

Figure 15:
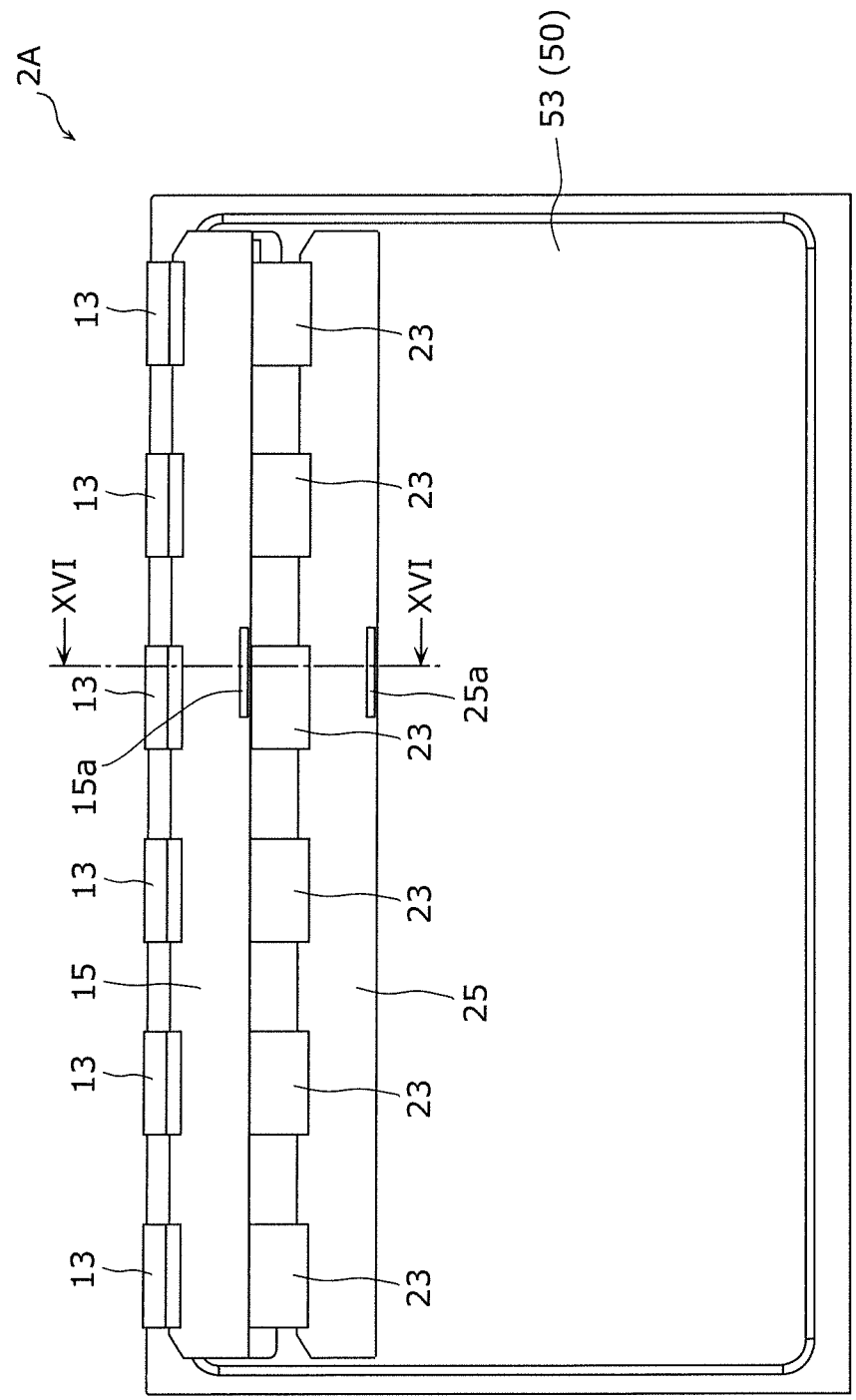
FIG. 15 is a rear view of a liquid crystal display device according to a modification of the second exemplary embodiment.
Figure 16:
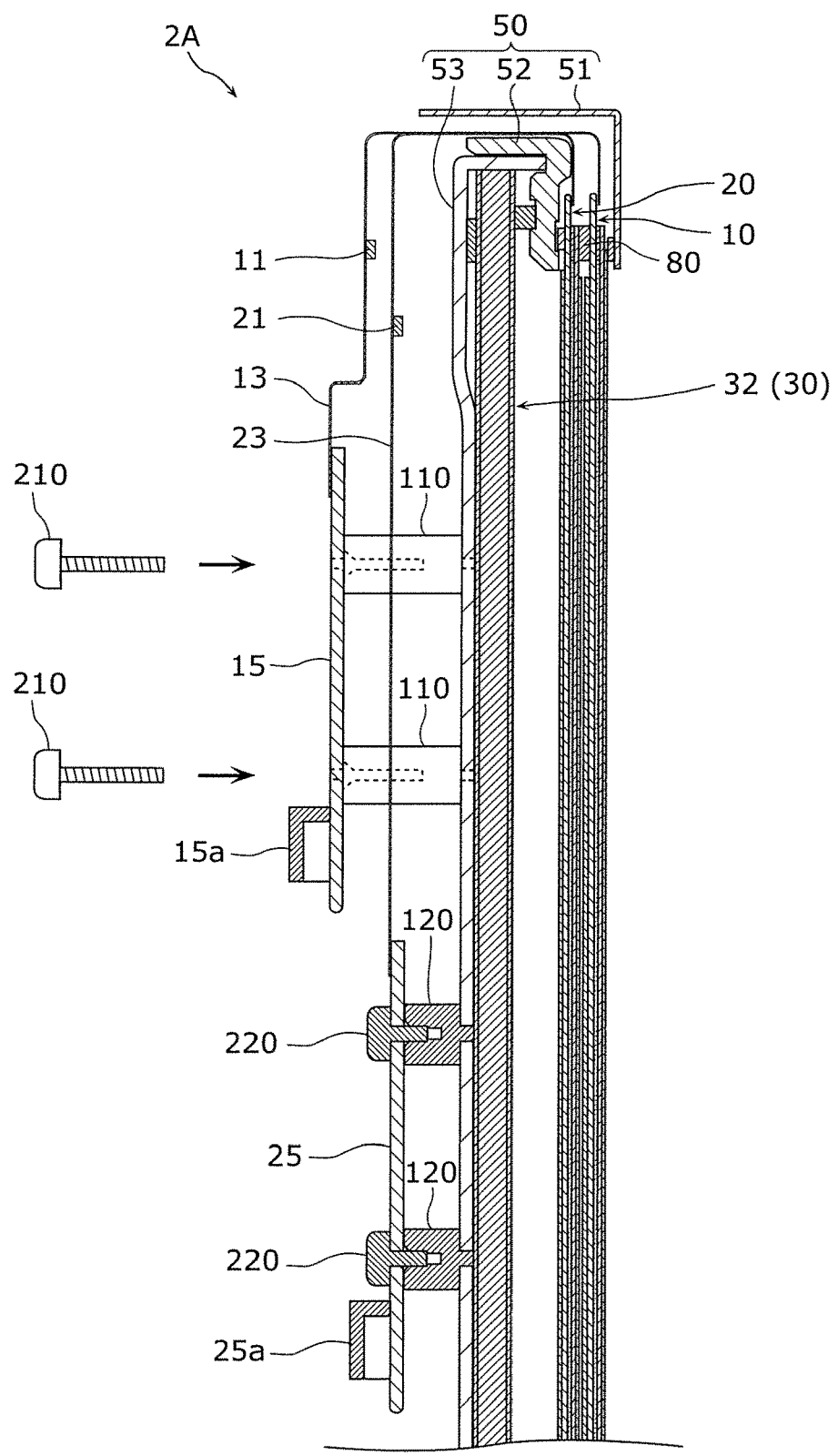
FIG. 16 is a partial sectional view of the liquid crystal display device according to the modification of the second exemplary embodiment, taken along line XVI-XVI in FIG. 15.

In the present exemplary embodiment, first circuit board 15 and second circuit board 25 are disposed in the offset state such that a part of second circuit board 25 is exposed from first circuit board 15. Alternatively, as in liquid crystal display device 2A illustrated in FIGS. 15 and 16, when liquid crystal display device 2A is viewed from the back surface, first circuit board 15 and second circuit board 25 may be disposed in the offset state such that the second circuit board 25 is entirely exposed from first circuit board 15. In this case, first circuit board 15 and second circuit board 25 are fixed with no use of spacer bolt 100, so that first circuit board 15 and second circuit board 25 can more simply be fixed to lower frame 53. As illustrated in FIG. 16, in the modification, the length of second source FPC 23 is longer than the length of first source FPC 13.

Other Modifications

The liquid crystal display device of the present disclosure has been described above based on the first and second exemplary embodiments. However, the present disclosure is not limited to the first and second exemplary embodiments.

For example, in the first and second exemplary embodiments, first source FPC 13 and second source FPC 23 are provided only at the long-side end on the upper side in the two long-side ends in each of first liquid crystal cell 10a and second liquid crystal cell 20a. Alternatively, first source FPC 13 and second source FPC 23 may be provided only at the long-side end on the lower side in the two long-side ends, or provided at both the two long-side ends. That is, first circuit board 15 and second circuit board 25 may be connected to at least one of the two long-side ends in first liquid crystal cell 10a and second liquid crystal cell 20a, respectively. The present disclosure may be applied to a circuit board on the gate side as long as the circuit board is connected to first gate FPC 14 and second gate FPC 24. Although first source FPC 13 and second source FPC 23 are source FPCs, first source FPC 13 and second source FPC 23 may be drain FPCs. That is, first circuit board 15 and second circuit board may be drain PCBs.

In the first and second exemplary embodiments, first arm 61 of holder 60 has latching claw 63 and second arm 62 of holder 60 has latching hole 64. Alternatively, for example, first arm 61 of holder 60 may have latching hole 64 and second arm 62 may have latching claw 63. Although the example in which a latching body is constructed as the latching hole 64 has been illustrated in the first and second exemplary embodiments, the present disclosure is not limited to the first and second exemplary embodiments. The latching body may be anything that latches latching claw 63. For example, the latching body may be a claw or a groove. The attachment and detachment structure of first arm 61 and second arm 62 in holder 60 is not limited to the latching structure.

In the first and second exemplary embodiments, holder 60 includes two arms of first arm 61 and second arm 62. However, holder 60 is not limited to the first and second exemplary embodiments. For example, holder 60 may include a third arm in addition to first arm 61 and second arm 62. In this case, second circuit board 25 can be sandwiched between the second arm and the third arm, and the second arm and the third arm can be used as the sandwiching portion.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:
1. A liquid crystal display device comprising:
a first liquid crystal cell;
a first circuit board connected to the first liquid crystal cell through a first flexible wiring board;
a second liquid crystal cell disposed opposite to the first liquid crystal cell; and a second circuit board connected to the second liquid crystal cell through a second flexible wiring board; wherein the first liquid crystal cell overlaps the second liquid crystal cell, the second liquid crystal cell is disposed between the first liquid crystal cell and the first circuit board, the second liquid crystal cell is disposed between the first liquid crystal cell and the second circuit board, the second flexible wiring board is disposed between the second liquid crystal cell and the first circuit board in a direction perpendicular to a display surface of the second liquid crystal cell, and the first circuit board and the second circuit board are disposed in an offset state such that a part of second circuit board is exposed from first circuit board in planar view; and the first circuit board and the second circuit board are kept in place by having a pressing portion in between.

2. The liquid crystal display device according to claim 1, wherein the first circuit board and the second circuit board are disposed in the offset state such that the second circuit board is entirely exposed from first circuit board in planar view.

3. The liquid crystal display device according to claim 1, wherein a length of the second flexible wiring board is longer than a length of the first flexible wiring board.

4. The liquid crystal display device according to claim 2, wherein a length of the second flexible wiring board is longer than a length of the first flexible wiring board.

5. The liquid crystal display device according to claim 1, wherein the first circuit board and the second circuit board are fixed without use of a spacer bolt.

6. The liquid crystal display device according to claim 1, further comprising:

a backlight disposed on a back surface side of the second liquid crystal cell; and a lower frame disposed on a back surface side of the backlight, wherein the first circuit board and the second circuit board are fixed to the lower frame.

7. The liquid crystal display device according to claim 6, further comprising:

a holder that holds the second circuit board, wherein the second circuit board is fixed to the lower frame via the holder.

8. The liquid crystal display device according to claim 7, wherein the holder is made of an insulating resin material.

9. The liquid crystal display device according to claim 1, wherein the first liquid crystal cell displays a color image, and the second liquid crystal cell displays a monochrome image corresponding to the color image displayed in the first liquid crystal cell.

10. The liquid crystal display device according to claim 1, wherein the first flexible wiring board is connected to the first liquid crystal cell at one side of the liquid crystal display device, and the second flexible wiring board is connected to the second liquid crystal cell at the same side as the one side of the liquid crystal display device.

11. A liquid crystal display device comprising:

a first liquid crystal cell;

a first circuit board connected to the first liquid crystal cell through a first flexible wiring board;

a second liquid crystal cell disposed opposite to the first liquid crystal cell; and a second circuit board connected to the second liquid crystal cell through a second flexible wiring board; wherein the first liquid crystal cell overlaps the second liquid crystal cell, the second liquid crystal cell is disposed between the first liquid crystal cell and the first circuit board, the second liquid crystal cell is disposed between the first liquid crystal cell and the second circuit board, the first circuit board overlaps the second flexible wiring board in a direction perpendicular to a display surface of the second liquid crystal cell, and the first circuit board and the second circuit board are disposed in an offset state such that a part of second circuit board is exposed from first circuit board in planar view; and the first circuit board and the second circuit board are kept in place by having a pressing portion in between.

12. A liquid crystal display device comprising:

a first liquid crystal cell;

a first circuit board connected to the first liquid crystal cell through a first flexible wiring board;

a second liquid crystal cell disposed opposite to the first liquid crystal cell; and a second circuit board connected to the second liquid crystal cell through a second flexible wiring board; wherein the first liquid crystal cell overlaps the second liquid crystal cell, the first flexible wiring board is connected to the first liquid crystal cell at a side of the first liquid crystal cell corresponding to a first side of the liquid crystal display device in plan view, the second flexible wiring board is connected to the second liquid crystal cell at a side of the second liquid crystal cell corresponding to the first side of the liquid crystal display device in plan view, the second liquid crystal cell is disposed between the first liquid crystal cell and the first circuit board in a direction perpendicular to a display surface of the second liquid crystal cell, the second liquid crystal cell is disposed between the first liquid crystal cell and the second circuit board, and the first circuit board and the second circuit board are disposed in an offset state such that a part of second circuit board is exposed from first circuit board in planar view; and the first circuit board and the second circuit board are kept in place by having a pressing portion in between.

* * * * *